(12) United States Patent
Flores et al.

(10) Patent No.: US 9,290,997 B2
(45) Date of Patent: *Mar. 22, 2016

(54) DOWNHOLE TOOLS INCLUDING BEARINGS AND METHODS OF FORMING SAME

(71) Applicants: Baker Hughes Incorporated, Houston, TX (US); ELEMENT SIX LTD, County Clare (IE)

(72) Inventors: Alejandro Flores, The Woodlands, TX (US); Aaron J. Dick, Houston, TX (US); Chih C. Lin, Huntsville, TX (US); John F. Bradford, The Woodlands, TX (US); Louise F. van Staden, Gauteng (ZA); Gregory B. Swanepoel, Gauteng (ZA); Clement D. van der Riet, Spring, TX (US); Siu-Wah Wai, Bradbury (AU); Dragan Vukovic, Johannesburg (ZA); Klaus Tank, Johannesburg (ZA)

(73) Assignees: Baker Hughes Incorporated, Houston, TX (US); Element Six Limited, County Clare (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,080

(22) Filed: Jun. 23, 2014

(65) Prior Publication Data

US 2014/0301679 A1    Oct. 9, 2014

Related U.S. Application Data

(63) Continuation of application No. 13/250,335, filed on Sep. 30, 2011, now Pat. No. 8,834,026.

(60) Provisional application No. 61/388,998, filed on Oct. 1, 2010.

(51) Int. Cl.
*E21B 10/23* (2006.01)
*F16C 17/10* (2006.01)
(Continued)

(52) U.S. Cl.
CPC ............... *E21B 10/23* (2013.01); *F16C 17/10* (2013.01); *F16C 33/106* (2013.01); *F16C 43/04* (2013.01); *F16C 2352/00* (2013.01); *Y10T 29/49679* (2015.01)

(58) Field of Classification Search
CPC ..... E21B 10/22; E21B 10/23; F16C 2352/00; F16C 23/02; F16C 17/02; F16C 17/04; F16C 17/10; F16C 33/10; F16C 33/1025; F16C 33/103; F16C 33/106; F16C 33/1065; F16C 33/1085; F16C 43/04; Y10T 29/49679
See application file for complete search history.

(56) References Cited

U.S. PATENT DOCUMENTS 2,272,128 A    2/1942   Osbourne
3,476,446 A   11/1969   Neilson
(Continued)

FOREIGN PATENT DOCUMENTS

CN    1110764 A    10/1995
CN    2670577 Y     1/2005

OTHER PUBLICATIONS

Chinese Office Action and Search Report for Chinese Application No. 201180055137.1 dated Jul. 3, 2014, 13 pages.
(Continued)

*Primary Examiner* — Alan B Waits
(74) *Attorney, Agent, or Firm* — TraskBritt

(57) ABSTRACT

Bearings for downhole tools including a first bearing member and a second bearing member, at least one of the first and second bearing members having a channel formed therein. Methods of cooling bearings of downhole tools comprise flowing a fluid within a channel formed in at least one bearing member. Heat is transferred from at least the at least one bearing member to the fluid. The fluid is flowed away from the at least one bearing member.

18 Claims, 17 Drawing Sheets

(51) Int. Cl.
F16C 33/10 (2006.01)
F16C 43/04 (2006.01)

(56) References Cited

U.S. PATENT DOCUMENTS

| | | | |
|---|---|---|---|
| 4,141,605 A | | 2/1979 | Riordan et al. |
| 4,151,686 A | | 5/1979 | Lee et al. |
| 4,232,912 A | * | 11/1980 | Williamson ............... 384/93 |
| 4,386,663 A | | 6/1983 | Ippolito |
| 4,459,048 A | | 7/1984 | Stachuletz et al. |
| 4,511,307 A | | 4/1985 | Drake |
| 4,555,186 A | * | 11/1985 | Scruggs ............... 384/93 |
| 4,569,601 A | | 2/1986 | Ippolito |
| 4,593,776 A | * | 6/1986 | Salesky et al. ............... 175/375 |
| 4,620,803 A | * | 11/1986 | Vezirian ............... 384/93 |
| 4,732,491 A | | 3/1988 | Geczy |
| 4,738,322 A | | 4/1988 | Hall et al. |
| 4,756,631 A | | 7/1988 | Jones |
| 4,764,036 A | | 8/1988 | McPherson |
| 4,772,188 A | | 9/1988 | Kimura et al. |
| 4,789,250 A | | 12/1988 | Schleuter et al. |
| 4,789,251 A | | 12/1988 | McPherson et al. |
| 4,802,539 A | | 2/1989 | Hall et al. |
| 4,875,532 A | | 10/1989 | Langford |
| 5,092,687 A | | 3/1992 | Hall |
| 5,112,188 A | | 5/1992 | Barnetche-Gonzalez |
| 5,133,639 A | | 7/1992 | Gay |
| 5,560,716 A | | 10/1996 | Tank et al. |
| 5,593,231 A | | 1/1997 | Ippolito et al. |
| 5,655,611 A | | 8/1997 | Dolezal |
| 5,679,894 A | | 10/1997 | Kruger et al. |
| 6,068,070 A | | 5/2000 | Scott |
| 6,190,050 B1 | | 2/2001 | Campbell |
| 6,260,635 B1 | | 7/2001 | Crawford |
| 6,280,089 B1 | | 8/2001 | Horng |
| 6,419,049 B1 | | 7/2002 | Joo |
| 6,460,635 B1 | | 10/2002 | Kalsi et al. |
| 6,543,132 B1 | | 4/2003 | Krueger et al. |
| 6,637,528 B2 | | 10/2003 | Nishiyama et al. |
| 6,652,147 B2 | | 11/2003 | Horng et al. |
| 7,296,641 B2 | | 11/2007 | Hadin et al. |
| 7,311,159 B2 | | 12/2007 | Lin et al. |
| 7,559,381 B2 | | 7/2009 | Lin |
| 7,647,992 B2 | | 1/2010 | Fang et al. |
| 7,896,551 B2 | | 3/2011 | Cooley et al. |
| 2001/0042644 A1 | | 11/2001 | Nishiyama et al. |
| 2003/0035603 A1 | | 2/2003 | Kaiser |
| 2004/0238226 A1 | | 12/2004 | Lin |
| 2005/0269885 A1 | | 12/2005 | Knox et al. |
| 2006/0140524 A1 | | 6/2006 | John et al. |
| 2006/0231292 A1 | | 10/2006 | Lin et al. |
| 2007/0151769 A1 | | 7/2007 | Slutz et al. |
| 2007/0186483 A1 | | 8/2007 | Tank et al. |
| 2007/0193782 A1 | | 8/2007 | Fang et al. |
| 2007/0261891 A1 | | 11/2007 | Williams et al. |
| 2007/0278017 A1 | | 12/2007 | Shen et al. |
| 2007/0284150 A1 | | 12/2007 | Lin |
| 2008/0056880 A1 | | 3/2008 | Eslinger |
| 2008/0304778 A1 | | 12/2008 | Horng |
| 2009/0097788 A1 | | 4/2009 | Cooley et al. |
| 2009/0205873 A1 | | 8/2009 | Dick et al. |
| 2010/0218995 A1 | | 9/2010 | Sexton et al. |
| 2011/0024198 A1 | | 2/2011 | Dick et al. |
| 2012/0080230 A1 | | 4/2012 | Flores et al. |

OTHER PUBLICATIONS

International Search Report for International Application No. PCT/US2011/054293 dated May 23, 2012, 4 pages.
International Written Opinion for International Application No. PCT/US2011/054293 dated May 23, 2012, 4 pages.
International Preliminary Report on Patentability for International Application No. PCT/US2011/054293 dated Apr. 11, 2013, 6 pages.
Sadangi et al., WC—Co-Diamond Nano-Composites, Nanostructured Materials, 1999, vol. 12, pp. 1032-1034.

* cited by examiner

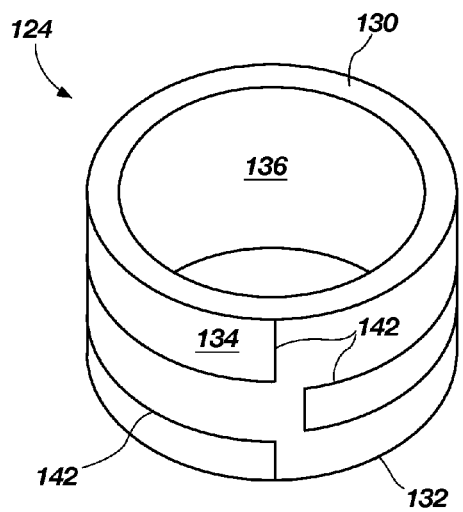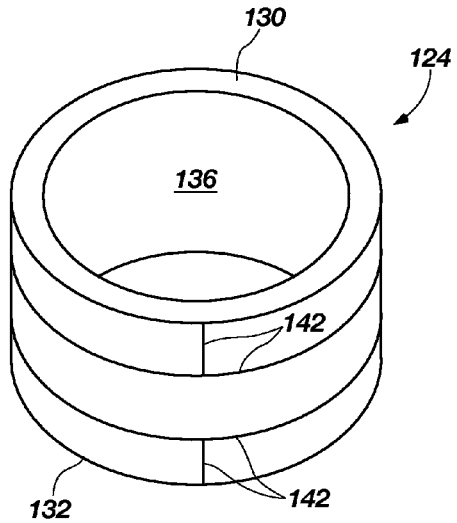
FIG. 4M  FIG. 4N
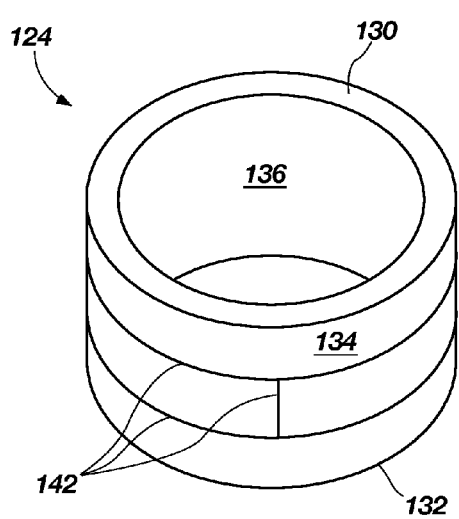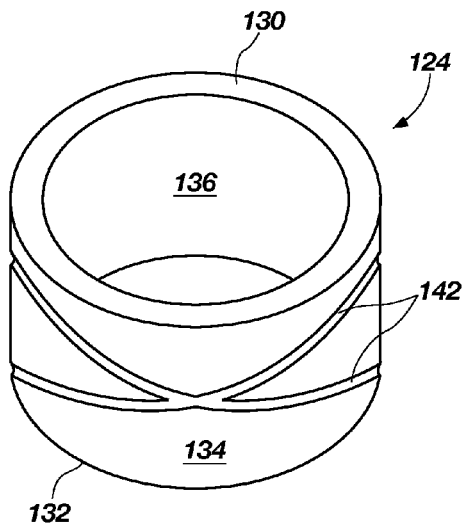
FIG. 4O  FIG. 4P

DOWNHOLE TOOLS INCLUDING BEARINGS AND METHODS OF FORMING SAME

CROSS-REFERENCE TO RELATED APPLICATIONS

This application is a continuation of U.S. patent application Ser. No. 13/250,335, filed Sep. 30, 2011, now U.S. Pat. No. 8,834,026, issued Sep. 16, 2014, which application claims the benefit of the filing date of U.S. Provisional Application Ser. No. 61/388,998, filed Oct. 1, 2010, the disclosure of each of which is incorporated herein in its entirety by this reference.

FIELD

Embodiments of the present invention relate generally to bearing systems for earth-boring tools and methods of cooling such bearing systems and, more specifically, to the cooling of downhole tool components using direct contact with drilling fluid.

BACKGROUND

Roller cone drill bits for drilling earth formations conventionally have roller cones mounted on bearing pins. As the bit rotates, the roller cones rotate on their respective bearing pins. Teeth formed on the roller cones, or inserts disposed in recesses on the roller cones, impact and crush the underlying earth formation material to form a borehole. Conventionally, bearings are disposed between the roller cones and the bearing pins to bear the forces to which the roller cones are subjected while the bit is rotated under applied axial force, commonly termed weight on bit, while allowing the roller cones to rotate on the bearing pins. The high forces present during drilling cause friction in the rotating components and generate heat, which may cause deterioration of the bearing. Bearing deterioration may cause bit failure, resulting in time-consuming and expensive removal and replacement of the bit from the borehole.

Friction or journal bearings used in roller cone bits may be sealed bearings or open bearings. Sealed bearing systems conventionally include a lubricant reservoir for supplying lubricant, such as a bearing grease, to the bearing surfaces between the roller cones and the bearing pins. A pressure compensator may be used to equalize the lubricant pressure with the fluid pressure within the borehole. Open bearing systems, by contrast, have no seals or bearing grease. Open bearing systems may use drilling fluid, such as a drilling mud, to both cool and lubricate the bearings.

BRIEF SUMMARY

In some embodiments, bearings for downhole tools comprise a first bearing member comprising an outer contact surface defining an outer diameter. A second bearing member comprises an inner contact surface defining an inner diameter, the inner diameter of the second bearing member being larger than the outer diameter of the first bearing member and the inner contact surface of the second bearing member being in sliding contact with the outer contact surface of the first bearing member at an interface. At least one of the first and second bearing members comprises at least one channel formed in a portion of the at least one of the first and second bearing members.

In additional embodiments, bearings for downhole tools comprise a first bearing member comprising a lower contact surface. A second bearing member comprises an upper contact surface, wherein the first bearing member abuts against the second bearing member at an interface between the lower contact surface and the upper contact surface, the first and second bearing members being configured to rotate slidably relative to one another. At least one of the first and second bearing members comprises at least one channel extending and configured to provide a fluid pathway across at least one of the first and second bearing members.

In further embodiments, bearings for downhole tools comprise a first bearing member comprising a generally cylindrical portion and a generally annular portion connected to the generally cylindrical portion and extending radially outward at an end of the cylindrical portion. The generally cylindrical portion comprises an outer contact surface defining an intermediate outer diameter of the first bearing member and the generally annular portion comprises a generally annular lower contact surface, the lower contact surface intersecting the outer contact surface and the lower and outer contact surfaces forming a substantially continuous surface. A second bearing member comprises a generally cylindrical portion and a generally annular portion connected to the generally cylindrical portion and extending radially outward at an end of the cylindrical portion. The generally cylindrical portion comprises an inner contact surface defining an inner diameter of the second bearing member and the generally annular portion comprises a generally annular upper contact surface, the upper contact surface intersecting the inner contact surface and the upper and inner contact surfaces forming a substantially continuous surface abutting the substantially continuous surface formed by the lower and outer contact surfaces of the first bearing member. At least one channel is formed in the first bearing member or the second bearing member.

In yet further embodiments, methods of cooling bearings of downhole tools include flowing a fluid within a channel formed in at least one bearing member. Heat is transferred from at least the at least one bearing member to the fluid. The fluid is flowed away from the at least one bearing member.

BRIEF DESCRIPTION OF THE SEVERAL VIEWS OF THE DRAWINGS

While the specification concludes with claims particularly pointing out and distinctly claiming what are regarded as embodiments of the present invention, various features and advantages of disclosed embodiments may be more readily ascertained from the following description when read in conjunction with the accompanying drawings, in which:

DETAILED DESCRIPTION

Figure 1:
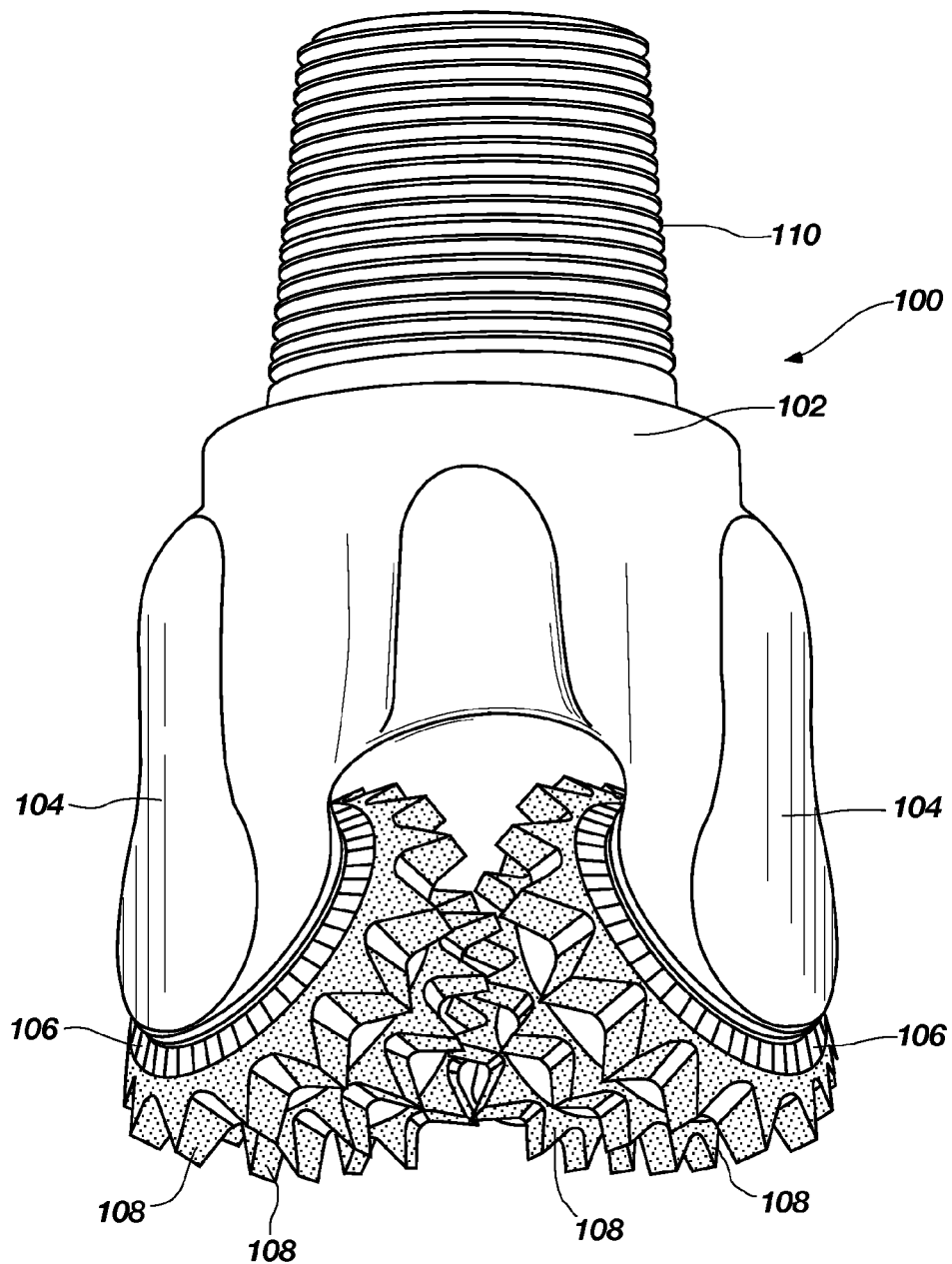
FIG. 1 is a perspective view of a roller cone bit including a bearing system.

The illustrations presented herein are not meant to be actual views of any particular material or device, but are merely idealized representations that are employed to describe the disclosed embodiments. Thus, the drawings are not necessarily to scale and relative dimensions may have been exaggerated for the sake of clarity. Additionally, elements common between figures may retain the same or similar numerical designation.

Embodiments of the present disclosure include bearing systems having channels formed therein to provide pathways for fluids. In some embodiments, a roller cone bit may include bearing systems having channels formed therein. In further embodiments, methods of cooling bearing systems include flowing a fluid through a bearing member using channels of the bearing member.

Although some embodiments of the present disclosure are depicted as being used and employed in roller cone bits, persons of ordinary skill in the art will understand that the present invention may be employed in any earth-boring tool where use of a bearing is desirable. Accordingly, the terms "roller cone bit," "earth-boring drill bit," and "earth-boring tool" as used herein, mean and include any type of bit or tool employing a component rotatable with respect to another component to which the component is mounted and used for drilling during the formation or enlargement of a wellbore in a subterranean formation and include, for example, roller cone bits, core bits, eccentric bits, bicenter bits, reamers, mills, hybrid bits employing both fixed and rotatable cutting structures, and other drilling bits and tools employing rotatable components, as known in the art.

Moreover, embodiments of the present invention may be employed in downhole tools that do not directly engage, shear, cut, or crush the underlying earth formation, but still include a component rotatable with respect to another component to which the component is mounted. Therefore, the term "downhole tool," as used herein, means includes any type of downhole tool employing a component rotatable with respect to another component to which the component is mounted, regardless of whether the downhole tool directly engages, shears, cuts, or crushes the underlying earth formation, such as, for example, Moineau-type "mud" motors, turbine motors, submersible pumps, roller cone bits, core bits, eccentric bits, bicenter bits, reamers, mills, hybrid bits employing both fixed and rotatable cutting structures, and other drilling bits and tools employing rotatable components, as known in the art.

As used herein, the term "drilling fluid" means and includes any type of fluid used for clearing away cuttings of an earth-formation during drilling. For example, a drilling fluid may be a gas, a liquid, or a combination of gas and liquid phases, such as compressed air, water, or a polymer. Drilling fluids specifically include without limitation, solids-laden liquids including a water-based mud, an oil-based mud, and a synthetic-based mud. Any combination of the foregoing is also encompassed by the term "drilling fluid."

As used herein, the term "working fluid" means and includes any fluid resident at an interface between two bearing members which may serve to lubricate and cool the bearing members during rotation of one or both bearing members with respect to the other. Working fluids include, without limitation, conventional lubricants employed in a sealed bearing system as well as drilling mud and other well bore fluids which may enter the interface of an open bearing system.

FIG. 1 is a perspective view of an earth-boring rotary drill bit 100 including a bearing system 128 (see FIGS. 2 and 3A) according to an embodiment. The drill bit 100, depicted as a roller cone bit, includes a bit body 102 having three legs 104 depending from the body 102. A roller cone 106 is rotatably mounted to a bearing pin 116 (see FIGS. 2 and 3A) on each of the legs 104. Each roller cone 106 may comprise a plurality of teeth 108, which as shown may be formed on roller cones 106 during fabrication thereof, and are commonly termed "mill tooth" bits. The drill bit 100 includes a threaded section 110 at its upper end for connection a drill string (not shown).

Figure 2:
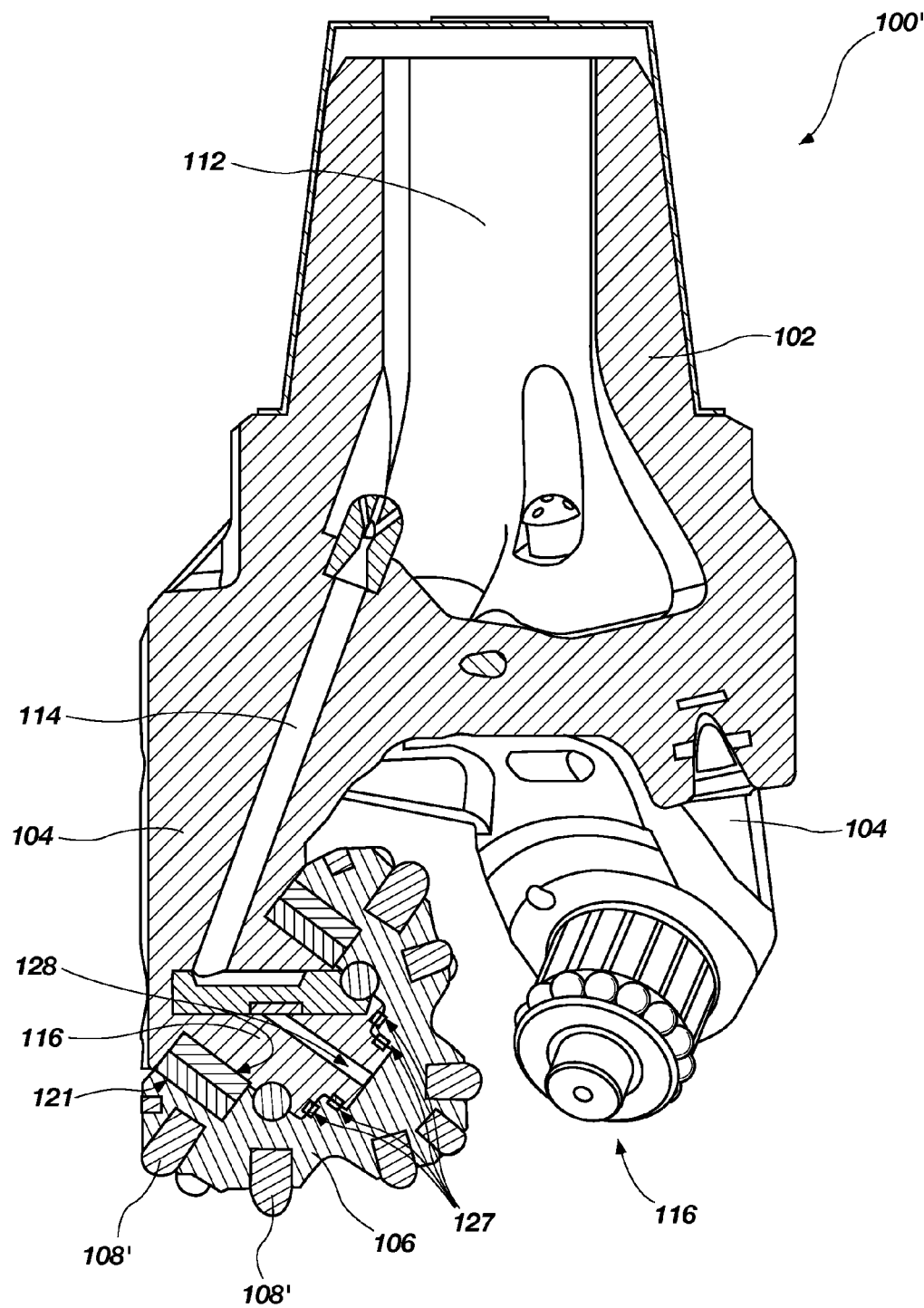
FIG. 2 is a partial cut-away perspective view of another roller cone bit similar to the roller cone bit of FIG. 1 showing an embodiment of a bearing system.

FIG. 2 is a partial cut-away perspective view of an earth-boring rotary drill bit 100' similar to the drill bit 100 of FIG. 1. The drill bit 100' has an internal plenum 112 that extends through the bit body 102 and fluid passageways 114 that extend from the plenum 112 to a bearing system 128. The bearing system 128 includes a primary bearing 121 and secondary bearings 127. During drilling, drilling fluid may be pumped down the center of the drill string, through the plenum 112 and fluid passageways 114, and to the bearing system 128. The drill bit 100' also includes legs 104 depending from the body 102. Roller cones 106 are rotatably mounted to bearing pins 116, although one bearing pin 116 is depicted without the roller cone 106 for the sake of clarity. The bearing pin 116 includes the bearing system 128, which is more fully described hereinafter. As depicted in FIG. 2, drill bit 100' employs preformed inserts 108', which are formed conventionally of cemented tungsten carbide and which may have a polycrystalline superabrasive coating (not shown) on the distal ends thereof or may include superabrasive particles interspersed among the tungsten carbide particles and metal matrix, known in the art as an impregnated insert.

Figure 3A:
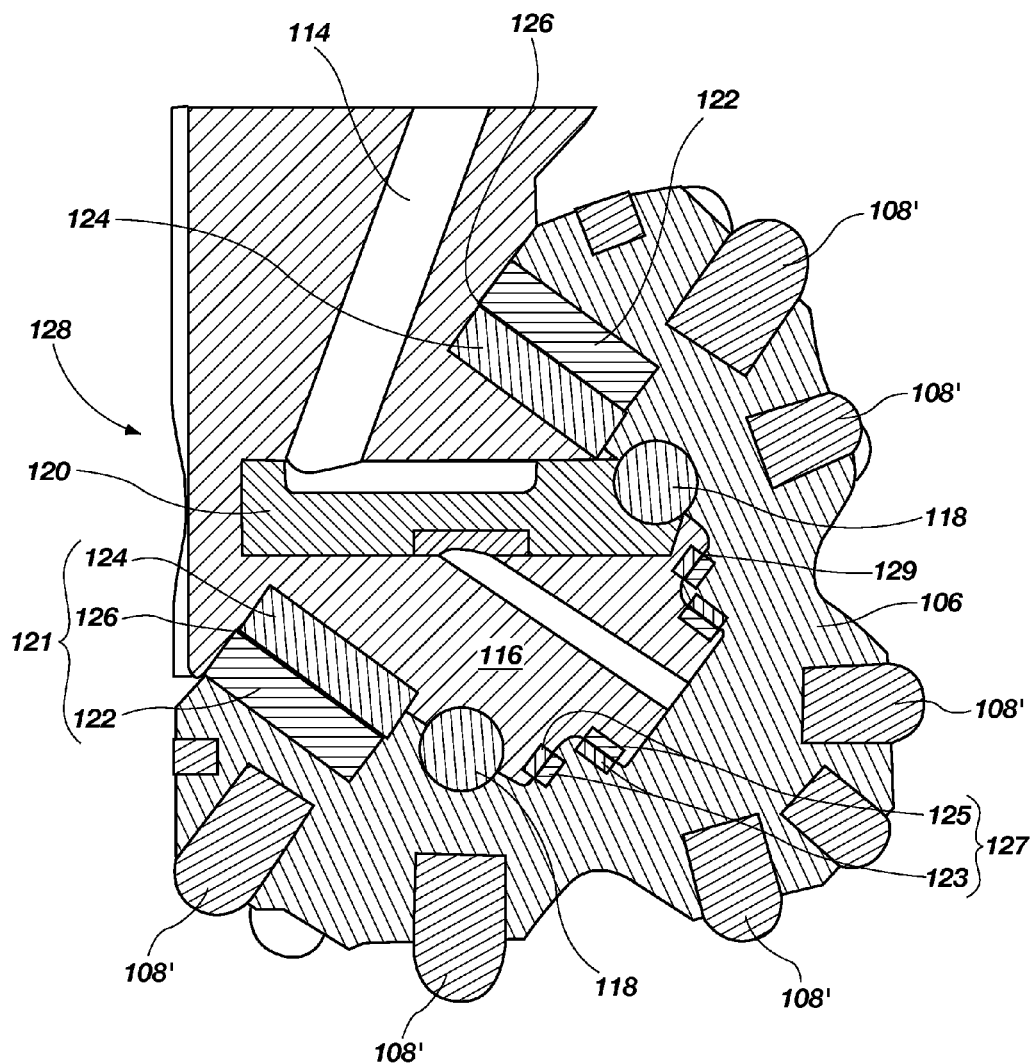
FIG. 3A is an enlarged cross-sectional view of the bearing system of FIG. 2.

FIG. 3A is an enlarged cross-sectional view of the bearing system 128 of FIG. 2. The bearing system 128 includes ball bearings 118, a ball plug or retainer 120, a primary bearing 121 comprising a primary cone bearing member 122 and a primary journal bearing member 124, and secondary bearings 127 comprising secondary cone bearing members 123 and secondary journal bearing members 125. The primary bearing 121 is configured to bear radial loads while the secondary bearings 127 are configured to bear radial loads and axial loads, respectively.

During assembly of the bearing system 128, a roller cone 106 including a primary cone bearing member 122 and secondary cone bearing members 123 is brought into proximity with and placed over a bearing pin 116 including a primary journal bearing member 124 and secondary journal bearing members 125 such that the bearing pin 116 is inserted into the roller cone 106. The primary cone bearing member 122 is placed over and at least substantially surrounds the primary journal bearing member 124 such that an inner contact surface of the primary cone bearing member 122 abuts an outer contact surface of the primary journal bearing member 124 at a first interface 126. In other words, the primary journal bearing member 124 is concentrically nested within the primary cone bearing member 122 such that the outer contact surface of the primary journal bearing member 124 is proximate the inner contact surface of the primary cone bearing member 122. The primary cone bearing member 122 and the primary journal bearing member 124 are configured to rotate slidably relative to one another as the roller cone 106 rotates about the bearing pin 116.

The secondary cone bearing members 123 abut the secondary journal bearing members 125 at second interfaces 129.

Like the primary bearings 121, one of the secondary cone bearing members 123 is received over one of the secondary journal bearing members 125, an outer contact surface of the secondary journal bearing member 125 abutting an inner contact surface of the secondary cone bearing member 123. Thus, one of the secondary bearings 127 may be configured to bear radial loads in a similar manner to the primary bearing 121. Another of the secondary bearings 127 may include another secondary cone bearing member 123 having an upper contact surface abutting a lower contact surface of another secondary journal bearing member 125. Thus, the other of the secondary bearings 127 may be configured to bear axial loads. The secondary cone bearing members 123 are configured to rotate slidably against the secondary journal bearing members 125 as the roller cone 106 rotates about the bearing pin 116.

Figure 3B:
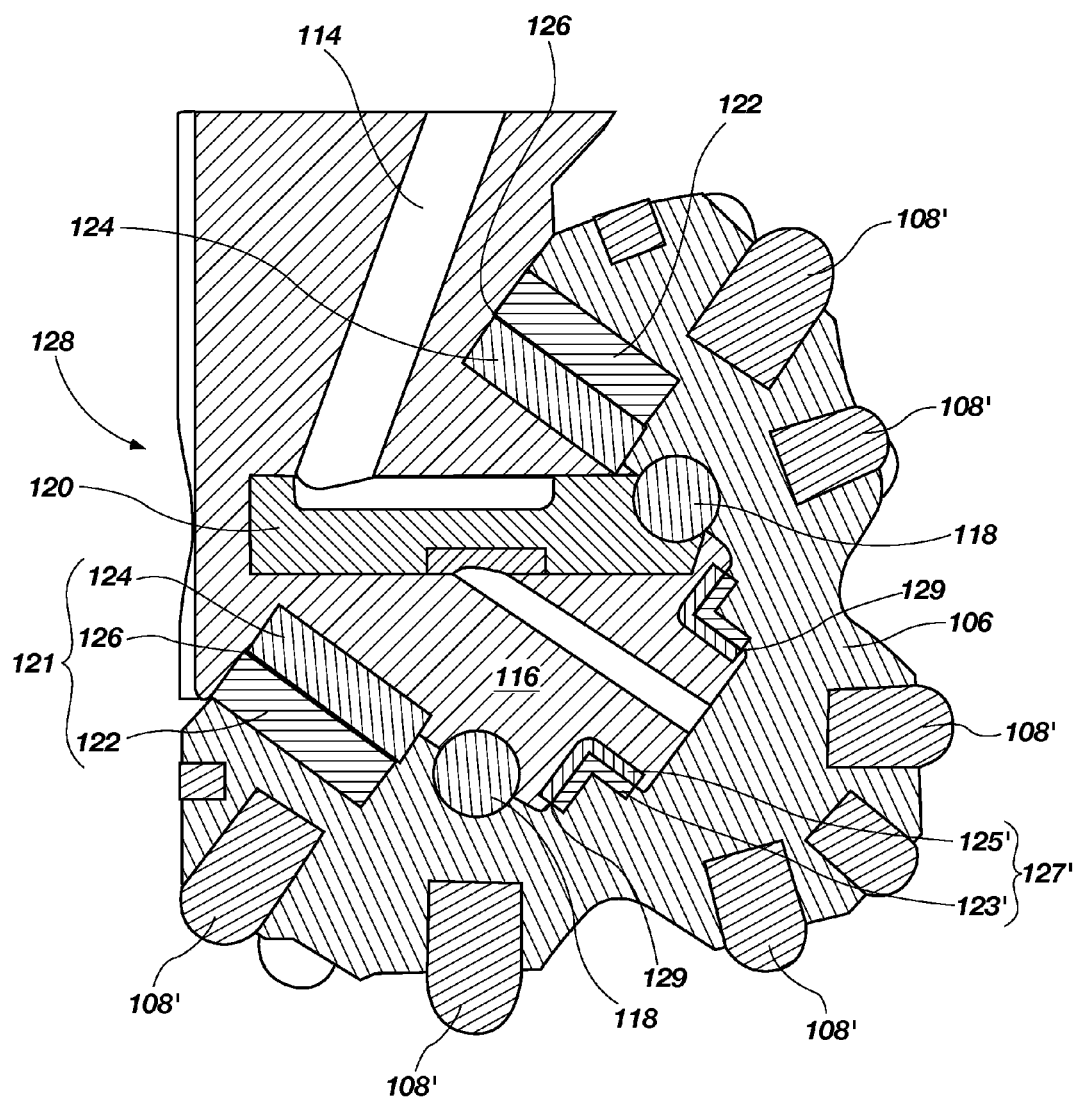
FIG. 3B is an enlarged cross-sectional view of another embodiment of a bearing system.

Referring to FIG. 3B, an enlarged cross-sectional view of another embodiment of a bearing system 128' is shown. The bearing system 128' may include a single secondary bearing 127' configured to bear both radial and axial loads, rather than the separate secondary bearings 127 shown in FIG. 3A.

Returning to FIG. 3A, the ball bearings 118 are inserted into a receiving ball race and the ball plug 120 inserted to retain the ball bearings 118 in the ball race. The ball plug 120 may be secured in place using, for example, a weld or a braze. As the drill bit 100' (see FIG. 2) rotates, the roller cone 106 rotates around the bearing pin 116, and inserts 108', depicted in FIG. 3A as discrete cutting elements received in recesses in the surface of roller cone 106, impact and crush the underlying earth formation.

Forces acting on the bearing system 128 as the roller cone 106 impacts the underlying earth formation cause heat generation and buildup, which can degrade the bearing system 128 and cause seizure of the roller cone 106, eventually causing the drill bit 100' to fail. As the drill bit rotates, drilling fluid is pumped down the center of the drill string through fluid passageways 114 to the bearing system 128 to lubricate and cool the bearing system 128 as the drilling fluid passes through the bearing system 128. To facilitate lubrication at the interfaces 126 and 129 between the primary and secondary cone bearing members 122 and 123 and the primary and secondary journal bearing members 124 and 125, respectively, and aid in heat removal, at least one channel may be provided in the primary cone bearing member 122, the secondary cone bearing members 123, the primary journal bearing member 124, the secondary journal bearing members 125, or any combination of these.

Figure 4A:
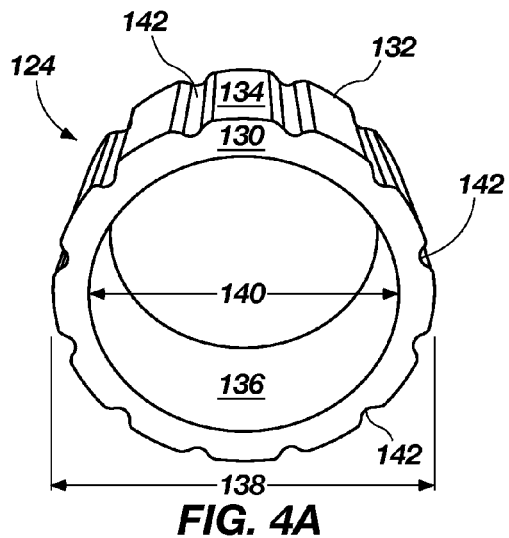
FIGS. 4A through 4Q are perspective views of embodiments of journal bearing members.
Figure 4B:
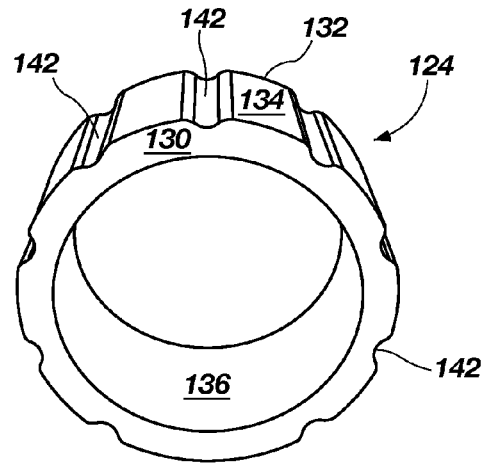
Figure 4C:
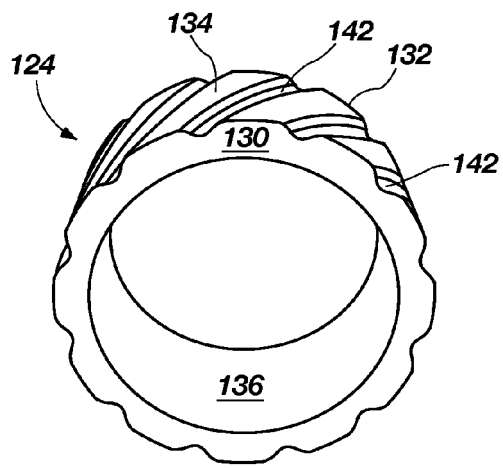
Figure 4D:
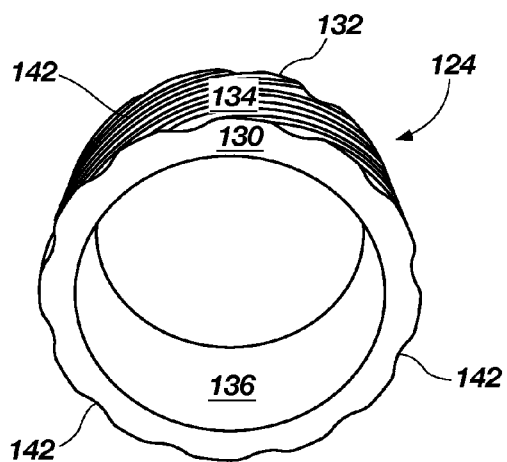
Figure 4E:
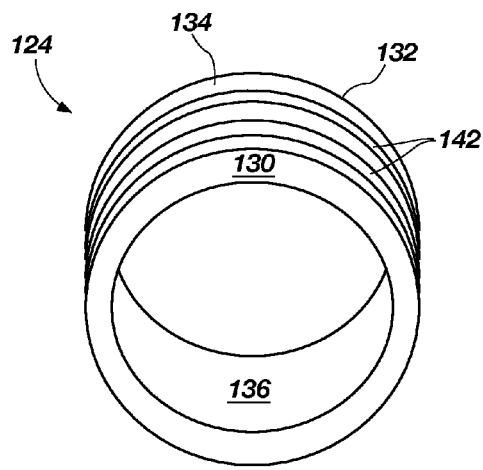
Figure 4F:
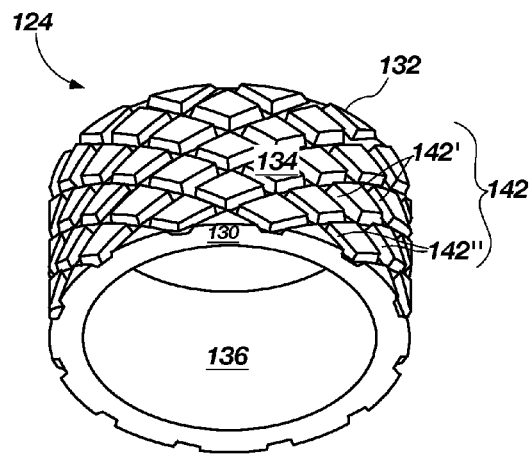
Figure 4G:
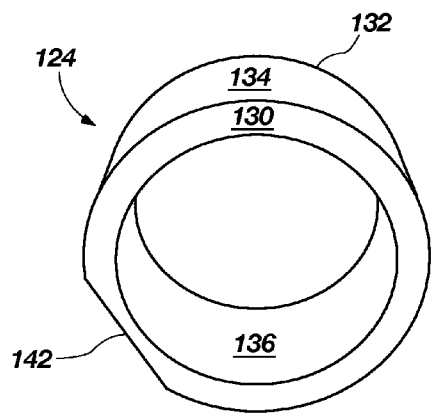
Figure 4H:
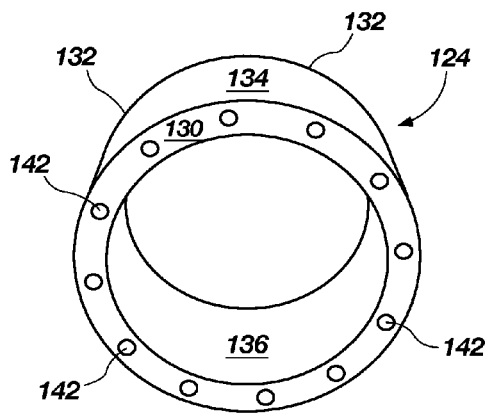
Figure 4I:
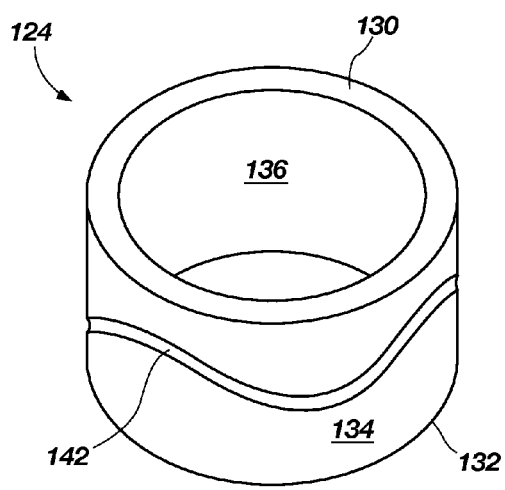
Figure 4J:
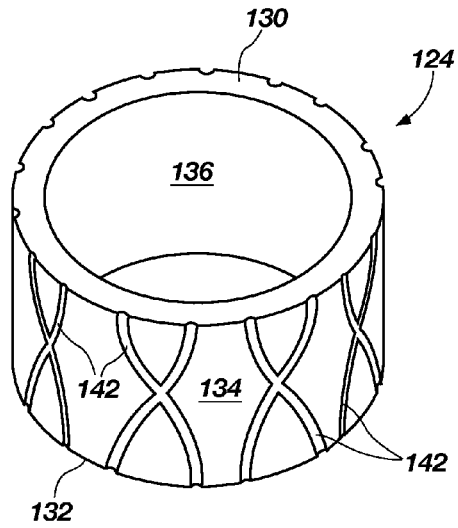
Figure 4K:
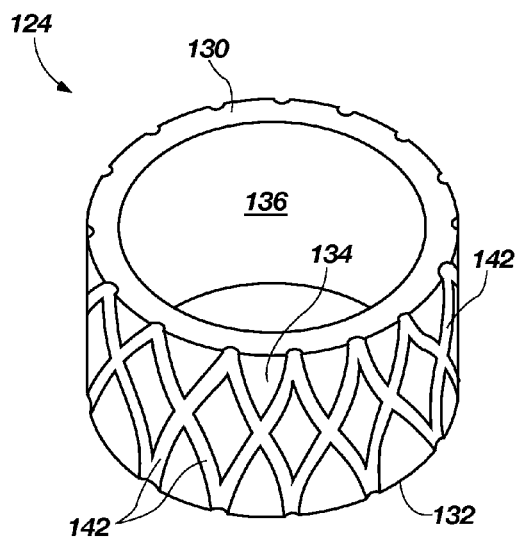
Figure 4L:
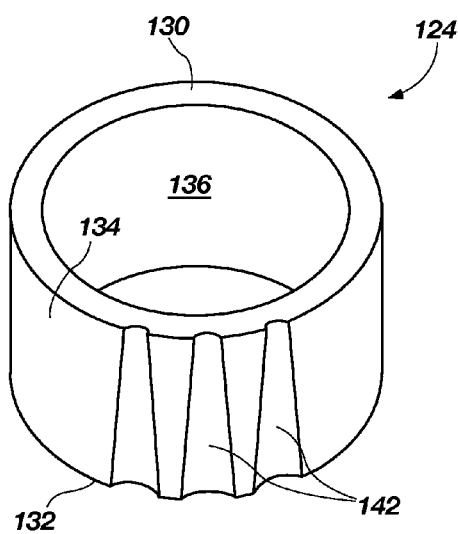
Figure 4Q:
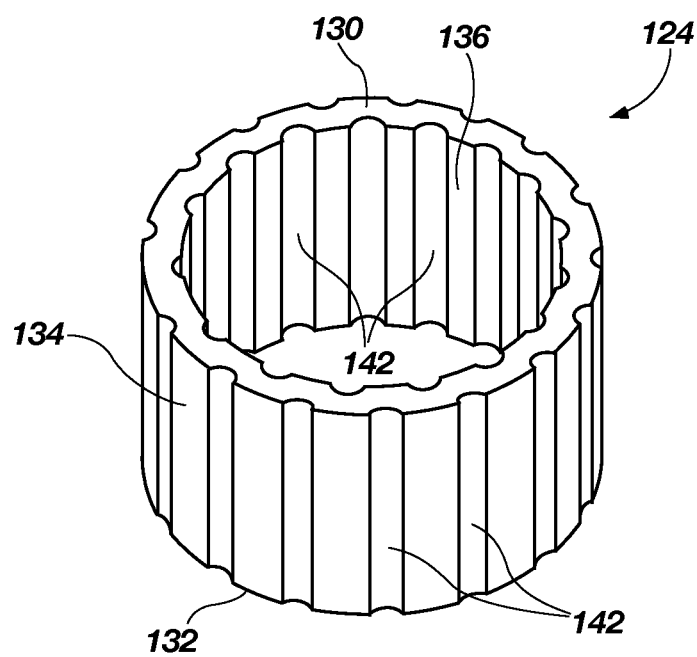

FIGS. 4A through 4Q illustrate various embodiments of primary journal bearing members 124. For example, FIG. 4A depicts an embodiment of a primary journal bearing member 124. The primary journal bearing member 124 may include a first side surface 130 and a second side surface 132 opposing the first side surface 130. Although the first and second opposing side surfaces 130 and 132 are depicted as being substantially parallel and planar, the opposing side surfaces 130 and 132 may have any shape or configuration, such as non-parallel and planar, arcuate, or other configurations. The opposing side surfaces 130 and 132 define an at least substantially annular cross-section of the primary journal bearing member 124. An outer contact surface 134 defines an outer diameter 138 of the primary journal bearing member 124, and an inner surface 136 defines an inner diameter 140 of the primary journal bearing member 124. The outer contact surface 134 and the inner surface 136 intersect with and are at least substantially perpendicular to the opposing side surfaces 130 and 132 such that the primary journal bearing member 124 has a generally cylindrical shape, as shown.

Channels 142 may be fixated in the outer contact surface 134 of the primary journal bearing member 124 to provide a fluid pathway between the opposing side surfaces 130 and 132 of the primary journal bearing member 124 in some embodiments. The channels 142 may comprise linear grooves that extend at least substantially parallel to a central axis of the primary journal bearing member 124 and may be distributed in a substantially uniform circumferential pattern around the outer contact surface 134. As drilling fluid is pumped through the bearing system 128 (see FIGS. 3A and 3B), the channels 142 may enable improved cooling of the primary journal bearing member 124 and other components in proximity thereto and may provide additional lubrication to the outer contact surface 134 of the primary journal bearing member 124 by providing pathways for the drilling fluid to flow from one opposing side surface 130 to the other opposing side surface 132.

As illustrated in FIG. 4B, channels 142 formed in the primary journal bearing member 124 may be distributed around the outer contact surface 134 in a non-uniform circumferential pattern. For example, the angular distance between the bottom two channels 142 on the primary journal bearing member 124 shown in FIG. 4B is greater than the angular distance between any other two adjacent channels 142. By increasing the angular distance between adjacent channels 142, the contact area between surfaces of the primary journal bearing member 124 and the primary cone bearing member 122 (see FIGS. 3A and 3B) is also increased. Furthermore, the total number of channels 142 shown in FIG. 4B is decreased relative to the number of channels 142 depicted in FIG. 4A because the angular distance between adjacent channels 142 is increased. Accordingly, persons of ordinary skill in the art will understand that any number of channels 142 may be located on the outer contact surface 134 of the primary journal bearing member 124, and that those channels 142 may be spaced in either uniform or non-uniform patterns around the primary journal bearing member 124.

As depicted in FIG. 4C, channels 142 formed in the primary journal bearing member 124 may comprise grooves that extend in a direction that is not parallel to a central axis of the primary journal bearing member 124. For example, the channels 142 formed in the primary journal bearing member 142 depicted in FIG. 4C comprise helically extending grooves on the outer contact surface 134 of the primary journal bearing member 124. The contact area between the primary cone bearing member 122 (see FIGS. 3A and 3B) and the primary journal bearing member 124 when the channels 142 comprise helically extending grooves may not be as great as the contact area between the primary cone bearing member 122 (see FIGS. 3A and 3B) and the primary journal bearing member 124 when the channels 142 comprise grooves extending in a direction parallel to a central axis of the primary journal bearing member 124. As the primary cone bearing member 122 (see FIGS. 3A and 3B) rotates slidably around the primary journal bearing member 124, however, the contact area between the two may remain at least substantially constant or continuous when the channels 142 comprise helically extending grooves due to circumferential overlap of opposing channels 142 in embodiments where channels 142 comprising helically extending grooves are formed in each of the primary journal bearing member 124 and the primary cone bearing member 122 (see FIGS. 5C and 5D). By contrast, the contact area between the primary cone bearing member 122 (see FIGS. 3A and 3B) and the primary journal bearing member 124 as the primary cone bearing member 122 (see FIGS. 3A and 3B) rotates around the primary journal bearing member 124 may intermittently vary when the channels 142 comprising grooves extending in a direction parallel to a central axis of the primary journal bearing member 124 due to intermittent overlap of opposing channels 142 in embodiments where channels 142 comprising helically extending grooves are formed in each of the primary journal bearing member 124 and the primary cone bearing member 122 (see FIG. 5A). Additionally, channels 142 comprising helically extending grooves may cause the working fluid to take a longer time to travel between the opposing side surfaces 130 and 132 of the primary journal bearing member 124, as compared with channels 142 comprising grooves extending in a direction parallel to a central axis, enabling the channels 142 comprising helically extending grooves to dissipate heat more effectively.

As shown in FIG. 4D, the helical angle of channels 142 comprising helically extending grooves in the outer contact surface 134 of the primary journal bearing member 124 may be increased relative to the helical angle of the channels 142 shown in FIG. 4C. Further, any number of channels 142 may be formed in the outer contact surface 134 of the primary journal bearing member 124. As the helical angle of the channels 142 increases, the continuous contact area between the primary journal bearing member 124 and the primary cone bearing member 122 (see FIGS. 3A and 3B) may increase and the effectiveness of the working fluid at dissipating heat from the primary bearing 121 (see FIGS. 2, 3A and 3B) may also increase. Accordingly, persons of ordinary skill in the art will understand that any number of channels 142 may be formed in the primary journal bearing member 124, and that the helical angle of helically extending channels 142 may comprise any helical angle.

Referring to FIG. 4E, another embodiment of a primary journal bearing member 124 is shown. The channels 142 formed in the primary journal bearing member 124 may not provide fluid communication between the opposing side surfaces 130 and 132 of the primary journal bearing member 124 in some embodiments. The channels 142 in such embodiments may comprise, for example, circumferentially extending grooves, which may form a closed flow path in the outer contact surface 134 of the primary journal bearing member 124. As a specific, non-limiting example, the channels 142 may comprise annular grooves defining a circular flow path around the circumference of the primary journal bearing member 124 and extending radially inward from the outer contact surface 134 of the primary journal bearing member 124, as shown in FIG. 4E. As another specific, non-limiting example, the channels 142 may define a non-annular (e.g., a zig-zag, sinusoidal, or other curvilinear) closed flow path around the outer circumference of the primary journal bearing member 124 and extending radially inward from the outer contact surface 134 of the primary journal bearing member 124. In some embodiments, a single channel 142 may extend circumferentially around the outer contact surface 134 to define a closed flow path. In other embodiments, a plurality of channels 142 may extend circumferentially around the outer contact surface 134 to define a closed flow path. For example, two channels 142 may extend parallel to one another around the circumference of the outer contact surface 134 of the primary journal bearing member 124, as shown in FIG. 4E. In other embodiments, greater than two channels 142 (e.g., three, four, five, etc.) may extend around the circumference of the outer contact surface 134 of the primary journal bearing member 124, as shown in FIG. 4E. In embodiments where at least one channel 142 defines a closed flow path around the outer contact surface 134 of the primary journal bearing member 124, the channel or channels 142 may increase lubrication at the first interface 126 of the primary bearing 121 (see FIGS. 3A and 3B) by acting as a local reservoir in which the working fluid may collect and from which the working fluid may flow into the interface 126 between the primary journal bearing member 124 and the primary cone bearing member 122 (see FIGS. 3A and 3B).

In addition, the channels 142 defining a closed flow path around the outer contact surface 134 of the primary journal bearing member 124 may be particularly likely to create a gap through which working fluid may flow between the primary journal bearing member 124 and the primary cone bearing member 122 (see FIGS. 3A and 3B), causing the primary cone bearing member 122 (see FIGS. 3A and 3B) to hover or float around the primary journal bearing member 124. For example, a distance between the primary journal bearing member 124 and the primary cone bearing member 122 may be between about 0.01 mm and about 1.00 mm. More specifically, the distance between the primary journal bearing member 124 and the primary cone bearing member 122 as the primary cone bearing member 122 rotates around the primary journal bearing member 124 may be between about 0.15 mm and 0.25 mm. Naturally, the distance between the primary cone and journal bearing members 122 and 124 may not be constant due to relative movement between the primary cone and journal bearing members 122 and 124, for example, in response to changes in pressure of the working fluid, the presence of abrasive particles to be removed by the working fluid, forces acting on the primary cone and journal bearing members 122 and 124, and other factors that may cause the primary cone and journal bearing members 122 and 124 to jostle or otherwise move relative to one another.

Referring to FIG. 4F, another embodiment of a primary journal bearing member 124 is shown. The channels 142 formed in the primary journal bearing member 124 may comprise grooves that extend in different directions that are not parallel to a central axis of the primary journal bearing member 124. For example, the channels 142 fanned in the primary journal bearing member 124 depicted in FIG. 4F comprise a first plurality of channels 142' comprising helical grooves extending in a first direction on the outer contact surface 134 of the primary journal bearing member 124 and a second plurality of channels 142" comprising helical grooves extending in a second, transverse direction on the outer contact surface 134 of the primary journal bearing member 124. Thus, the channels 142 may form a crosshatch pattern in the outer contact surface 134 of the primary journal bearing member 124.

As illustrated in FIG. 4G, a channel 142 may be formed in the outer contact surface 134 of the primary journal bearing member 124 that comprises a single notch, which may also be characterized as a flat. When the channel 142 comprises a single notch, depending on the circumferential extent of the notch, the contact area between the primary journal bearing member 124 and the primary cone bearing member 122 may be increased relative to other channel configurations. Further, the relatively large size of the channel 142 comprising a notch may enable solids and debris resident in the drilling fluid to pass more easily through the channel 142, which may reduce the potential for blockage of the fluid flow. Accordingly, persons of ordinary skill in the art will understand that the channels 142 may comprise any number of channels 142 and may comprise larger notches or smaller grooves of any desirable size, depth, or cross-sectional shape.

As shown in FIG. 4H, channels 142 may not be formed in the outer contact surface 134 of the primary journal bearing member 124, but may be positioned within the wall of the primary journal bearing member 124 between outer contact surface 134 and inner surface 136 and extend between the opposing side surfaces 130 and 132, to openings thereon.

Although the internally extending channels 142 may not provide additional lubrication to the outer contact surface 134, they may still provide beneficial cooling to the bearing system 128 (see FIGS. 3A and 3B). Accordingly, persons of ordinary skill in the art will understand that channels 142 may be formed in the outer contact surface 134 of the primary journal bearing member 124, or may be formed in the wall of the primary journal bearing member 124.

Referring to FIG. 4I, a perspective view of another embodiment of a primary journal bearing member 124 is shown. The primary journal bearing member 124 may include a single channel 142 formed in the outer contact surface 134 of the primary journal bearing member 124. The channel 142 may comprise a groove defining a sinusoidal path around the circumference of the outer contact surface 134 of the primary journal bearing member 124. Such a configuration may increase cooling of the primary journal bearing member 124 when compared to an annular channel 142 (see FIG. 4E) because the increased length of the flow path around the primary journal bearing member 124 may provide a larger reservoir of working fluid to cool the bearing.

Referring to FIG. 4J, a perspective view of another embodiment of a primary journal bearing member 124 is shown. The primary journal bearing member 124 may include a plurality of channels 142 not substantially aligned with the axis of rotation of the primary cone bearing member 122 (see FIGS. 3A and 3B) and extending between the opposing side surfaces 130 and 132. For example, the channels 142 may define curving paths, such as, for example, "S" shaped paths or curved paths at least substantially resembling a graph of a cubic function. Such curved channels 142 may provide increased cooling relative to axially aligned channels 142 (see FIG. 4A) due to the longer flow path for working fluid, which may increase the time during which heat from the primary journal bearing member 124 may be transferred to the working fluid. Adjacent channels 142 may curve in opposing directions such that at least some adjacent channels 142 intersect with at least some other adjacent channels 142 at points on the outer contact surface 134 between the opposing side surfaces 130 and 132, such as, for example, to define the "X" shaped configuration shown in FIG. 4J.

Referring to FIG. 4K, a perspective view of another embodiment of a primary journal bearing member 124 is shown. The primary journal bearing member 124 may include a plurality of channels 142 not substantially aligned with the axis of rotation of the primary cone bearing member 122 (see FIGS. 3A and 3B) and extending between the opposing side surfaces 130 and 132. For example, the channels 142 may define curving paths, such as, for example, "S" shaped paths or curved paths at least substantially resembling a graph of a cubic function. Adjacent channels 142 may curve in opposing directions and may be spaced such that adjacent channels 142 intersect at points on the outer contact surface 134 between the opposing side surfaces 130 and 132 and at points on the outer contact surface 134 adjacent the opposing side surfaces 130 and 132. In other words, the channels 142 may define a continuous flow path both between the opposing side surfaces 130 and 132 and around the circumference of the outer contact surface 134 of the primary journal bearing member 124.

Referring to FIG. 4L, a perspective view of another embodiment of a primary journal bearing member 124 is shown. The primary journal bearing member 124 may include a plurality of channels 142 clustered within a region of the outer contact surface 134 rather than distributed uniformly around the entire circumference of the outer contact surface 134. For example, the channels 142 may be positioned within a region offset from a region most likely to bear a load. More specifically, the channels 142 may be positioned at least 10° away from a region of the outer contact surface 134 at which loads are most likely to be applied and borne. Thus, the load-bearing area of the outer contact surface 134 may be increased relative to some embodiments where channels 142 are uniformly distributed around the circumference of the primary journal bearing member 124 (see, e.g., FIGS. 4A through 4D) and the region of the outer contact surface 134 most likely to bear loads may be free of channels 142 formed in the outer contact surface 134. In addition, the channels 142 may have non-constant widths. For example, a width of the channels 142 may increase from the first side surface 130 to the second side surface 132. In this way, a pressure gradient may be formed between the opposing side surfaces 130 and 132 of the primary journal bearing member 124.

Referring to FIG. 4M, a perspective view of another embodiment of a primary journal bearing member 124 is shown. The primary journal bearing member 124 may include a channel 142 that provides a continuous, tortuous flow path between the opposing side surfaces 130 and 132 of the primary journal bearing member 124. For example, the channel 142 may initially extend axially from the first side surface 130 toward the second side surface 132, may turn to extend radially around the outer contact surface 134 for less than the entire circumference, may turn again to extend axially toward the second side surface 132, may turn yet again to extend radially around the outer contact surface 134 for less than the entire circumference, and may finally turn to extend axially to the second side surface 132. The increased length of the flow path between the opposing side surfaces 130 and 132 may increase the cooling the working fluid may provide to the bearing due to longer exposure of the working fluid to the bearing.

Referring to FIGS. 4N and 4O, front and rear perspective views of another embodiment of a primary journal bearing member 124 are shown. The primary journal bearing member 124 may include a channel 142 that provides a continuous, tortuous flow path between the opposing side surfaces 130 and 132 of the primary journal bearing member 124 and around the circumference of the outer contact surface 134 of the primary journal bearing member 124. For example, the channel 142 may initially extend axially from the first side surface 130 toward the second side surface 132, as shown in FIG. 4N. The channel 142 may turn to extend radially around the outer contact surface 134 for the entire circumference, as shown in FIGS. 4N and 4O. The channel 142 may turn again to extend axially toward the second side surface 132, as shown in FIG. 4O. The channel 142 may turn yet again to extend radially around the outer contact surface 134 for the entire circumference, as shown in FIGS. 4N and 4O. The channel 142 may finally turn to extend axially to the second side surface 132, as shown in FIG. 4N. The increased length of the flow path between the opposing side surfaces 130 and 132 may increase the cooling the working fluid may provide to the bearing due to longer exposure of the working fluid to the bearing.

Referring to FIG. 4P, a perspective view of another embodiment of a primary journal bearing member 124 is shown. The primary journal bearing member 124 may include a plurality of channels 142 extending circumferentially around the outer contact surface 134. The channels 142 may extend in directions such that central axes of the channels 142 are oblique to a central axis of the journal bearing member 124. For example, the channels 142 may extend around the circumference of the outer contact surface 134 and may intersect with one another on opposing sides of the journal bearing member 124, as shown in FIG. 4P.

Referring to FIG. 4Q, a perspective view of another embodiment of a primary journal bearing member 124 is shown. In addition to the channels 142 formed in the outer contact surface 134, channels 142 may be aimed in the inner surface 136. For example, channels 142 extending in a direction parallel to a central axis of the primary journal bearing member 124 may extend between the opposing side surfaces 130 and 132 of the primary journal bearing member 124 on the inner surface 136, as shown in FIG. 4Q. In other embodiments, channels 142 in any of the configurations described previously in connection with FIGS. 4A through 4P may be formed in the inner surface 136. In still other embodiments, channels 142 may be formed in the inner surface 136 of the primary journal bearing member 124, but the outer contact surface 134 may lack channels 142. In still other embodiments, channels 142 may be formed in a shaft of the bearing pin 116 (see FIGS. 3A and 3B) to which the primary journal bearing member 124 may be attached. Channels 142 formed in the inner surface 136 of the primary journal bearing member 124 or in the bearing pin 116 (see FIGS. 3A and 3B) may provide beneficial cooling to the bearing and other components of the drill bit proximate to the bearing.

Figure 5A:
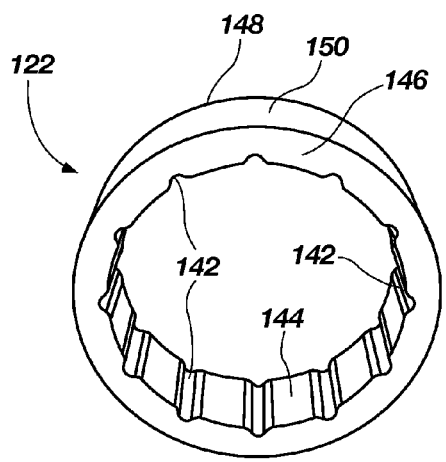
FIGS. 5A through 5I are perspective views of embodiments of cone bearing members.

FIGS. 5A through 5I illustrate various embodiments of primary cone bearing members 122 in accordance with the present invention. FIG. 5A depicts a primary cone bearing member 122 having channels 142 that comprise linear grooves formed in an inner contact surface 144 of the primary cone bearing member 122. The primary cone bearing member 122 comprises a generally cylindrical shape defined by outer surface 150, and includes an inner contact surface 144 defining an inner diameter of the primary cone bearing member 122. The channels 142 extend in a direction at least substantially parallel to a central axis of the primary cone bearing member 122, similar to the channels 142 shown in FIGS. 4A and 4B. Any number of channels 142 may be located on the inner contact surface 144 of the primary cone bearing member 122, and the channels 142 may be spaced in either uniform or non-uniform patterns around the inner contact surface 144 of the primary cone bearing member 122.

Figure 5B:
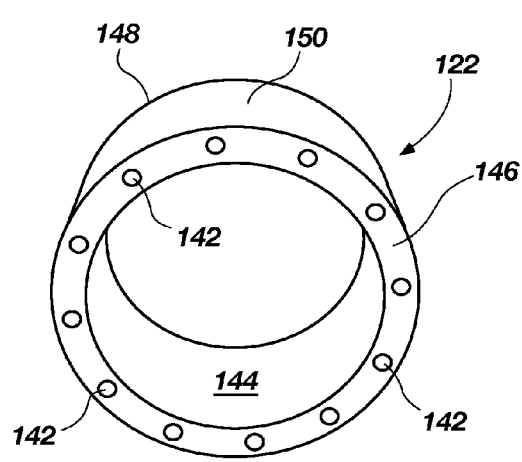

As illustrated in FIG. 5B, channels 142 may not be formed in the inner contact surface 144 of the primary cone bearing member 122, but may be positioned within the wall of the primary cone bearing member 122 between inner contact surface 144 and outer surface 150 and extend between openings at opposing side surfaces 146 and 148 of the primary cone bearing member 122, similar to the channels 142 depicted in FIG. 4H.

Figure 5C:
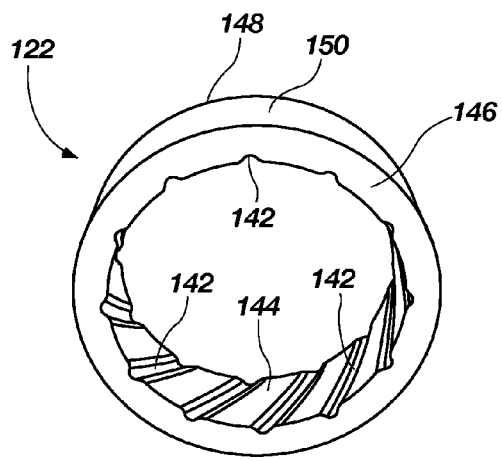
Figure 5D:
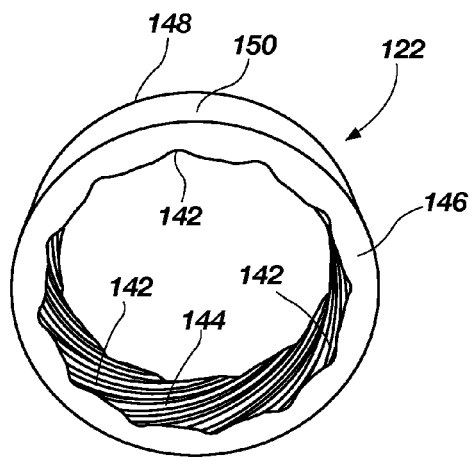

As shown in FIGS. 5C and 5D, channels 142 formed in the inner contact surface 144 of the primary cone bearing member 122 may extend in a direction that is not parallel to a central axis of the primary cone bearing member 122, similar to the channels 142 illustrated in FIGS. 4C and 4D. Any number of channels 142 may be formed in the inner contact surface 144 of the radial cone bearing member 142, and the channels 142 may extend helically at any desirable helical angle. Moreover, the channels 142 comprising a helix shape may be configured to act as a pump to facilitate fluid flow through the bearing system 128 (see FIGS. 3A and 3B).

Figure 5E:
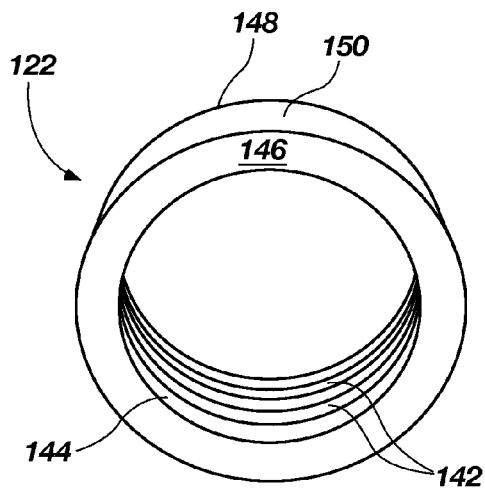

Referring to FIG. 5E, another embodiment of a primary cone bearing member 122 is shown. The channels 142 formed in the primary cone bearing member 122 may not provide fluid communication between the opposing side surfaces 146 and 148 of the primary cone bearing member 122 in some embodiments. The channels 142 in such embodiments may comprise, for example, circumferentially extending grooves, which may form a closed flow path in the inner contact surface 144 of the primary cone bearing member 122, similar to the channels shown in FIG. 4E. As a specific, non-limiting example, the channels 142 may comprise annular grooves defining a circular flow path around the circumference of the primary cone bearing member 122 and extending radially outward from the inner contact surface 144 of the primary cone bearing member 122, as shown in FIG. 5E. As another specific, non-limiting example, the channels 142 may define a non-annular (e.g., a zig-zag, sinusoidal, or other curvilinear) closed flow path around the inner circumference of the primary cone bearing member 122 and extending radially outward from the inner contact surface 144 of the primary cone bearing member 122. In some embodiments, a single channel 142 may extend circumferentially around the inner contact surface 144 to define a closed flow path. In other embodiments, a plurality of channels 142 may extend circumferentially around the inner contact surface 144 to define a closed flow path. In embodiments where at least one channel 142 defines a closed flow path around the inner contact surface 144 of the primary cone bearing member 122, the channel or channels 142 may increase lubrication at the first interface 126 of the primary bearing 121 (see FIGS. 3A and 3B) by acting as a local reservoir in which the working fluid may collect and from which the working fluid may flow into the interface 126 between the primary journal bearing member 124 (see FIGS. 3A and 3B) and the primary cone bearing member 122.

In addition, the channels 142 defining a closed flow path around the inner contact surface 144 of the primary cone bearing member 122 may be particularly likely to create a gap through which working fluid may flow between the primary journal bearing member 124 (see FIGS. 3A and 3B) and the primary cone bearing member 122, causing the primary cone bearing member 122 to hover or float around the primary journal bearing member 124. For example, a distance between the primary journal bearing member 124 (see FIGS. 3A and 3B) and the primary cone bearing member 122 may be between about 0.01 mm and about 1.00 mm. More specifically, the distance between the primary journal bearing member 124 (see FIGS. 3A and 3B) and the primary cone bearing member 122 as the primary cone bearing member 122 rotates around the primary journal bearing member 124 may be between about 0.15 mm and 0.25 mm. Naturally, the distance between the primary cone and journal bearing members 122 and 124 may not be constant due to relative movement between the primary cone and journal bearing members 122 and 124, for example, in response to changes in pressure of the working fluid, the presence of abrasive particles to be removed by the working fluid, forces acting on the primary cone and journal bearing members 122 and 124, and other factors that may cause the primary cone and journal bearing members 122 and 124 to jostle or otherwise move relative to one another.

Figure 5F:
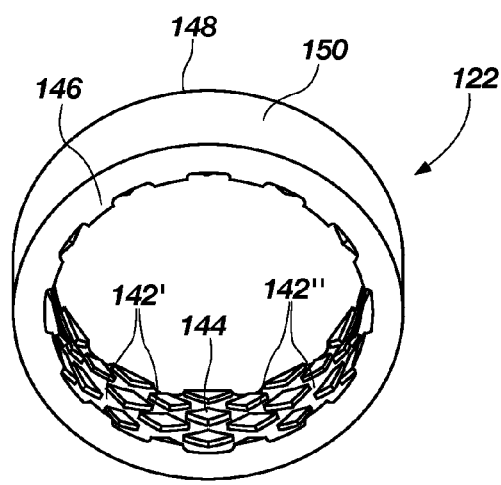

Referring to FIG. 5F, another embodiment of a primary cone bearing member 122 is shown. The channels 142 formed in the primary cone bearing member 122 may comprise grooves that extend in different directions that are not parallel to a central axis of the primary cone bearing member 122. For example, the channels 142 formed in the primary cone bearing member 122 depicted in FIG. 5F comprise a first plurality of channels 142' comprising helical grooves extending in a first direction on the inner contact surface 144 of the primary cone bearing member 122 and a second plurality of channels 142" comprising helical grooves extending in a second, transverse direction on the inner contact surface 144 of the primary cone bearing member 122, similar to the channels depicted in FIG. 4F. Thus, the channels 142 may form a crosshatch pattern in the inner contact surface 144 of the primary cone bearing member 122.

Figure 5G:
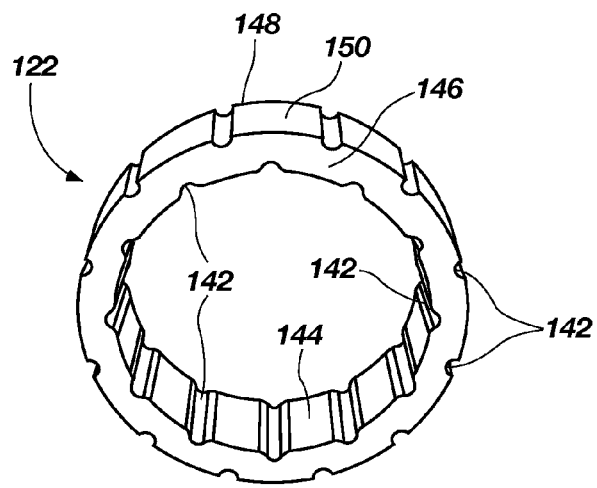

Referring to FIG. 5G, another embodiment of a primary cone bearing member 122 is shown. In addition to the channels 142 formed in the inner contact surface 144, channels 142 may be formed in the outer surface 150. For example, channels 142 extending in a direction parallel to a central axis of the primary cone bearing member 122 may extend between the opposing side surfaces 146 and 148 of the primary cone bearing member 122 on the outer surface 150, as shown in FIG. 5G. In other embodiments, channels 142 in any of the configurations described previously in connection with FIGS. 4A through 4Q may be formed in the outer surface 150. In still other embodiments, channels 142 may be formed in the outer surface 150 of the primary cone bearing member 122, but the inner contact surface 144 may lack channels 142. In still other embodiments, channels 142 may be formed in a body of the roller cone 106 (see FIGS. 3A and 3B) or in a body of a bushing (not shown) to which the primary cone bearing member 122 may be attached. Channels 142 formed in the outer surface 150 of the primary cone bearing member 122, in the roller cone 106 (see FIGS. 3A and 3B), or in the bushing (not shown) may provide beneficial cooling to the bearing and other components of the drill bit proximate to the bearing.

Figure 5H:
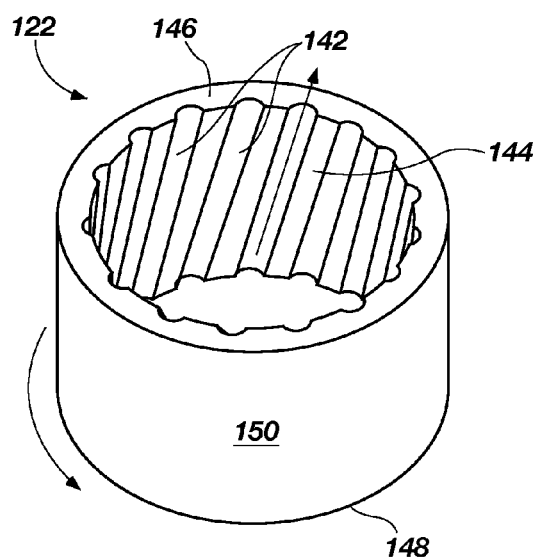

Referring to FIG. 5H, another embodiment of a primary cone bearing member 122 is shown. Primary cone bearing members 122 may be configured to create a pressure resisting a flow of working fluid through the channels 142 formed in the inner contact surface 144 of the primary cone bearing members 122. For example, a primary cone bearing member 122 may be configured to rotate in a counterclockwise direction around a primary journal bearing member 124 (see FIGS. 4A through 4Q) as indicated by the arrow surrounding the primary cone bearing member 122. In this orientation, the first side surface 146 may face toward the bit body 102 (see FIGS. 1 and 2) and the second side surface 148 may face an underlying earth formation (not shown). The counterclockwise rotation of the primary cone bearing member 122 may draw working fluid into the helically extending channels 142 from the second side surface 148 due to the angled orientation of the channels 142. As additional fluid is drawn into the channels 142 from the second side surface 148, the working fluid may create a pressure directed through the channels 142 to the first side surface 146, as indicated by the arrow extending along one of the channels 142 in FIG. 5H. Such action may resist the natural flow of the working fluid, which may be directed downward from the first side surface 146 to the second side surface 148. Thus, the direction of rotation of the primary cone bearing member 122 and the helical orientation of the channels 142 may resist the flow of working fluid through the channels 142.

Figure 5I:
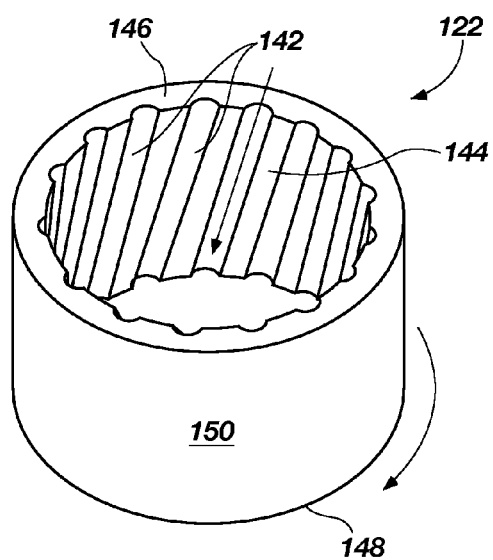

Referring to FIG. 5I, another embodiment of a primary cone bearing member 122 is shown. Primary cone bearing members 122 may be configured to create a pressure contributing to a flow of working fluid through the channels 142 formed in the inner contact surface 144 of the primary cone bearing members 122. For example, a primary cone bearing member 122 may be configured to rotate in a clockwise direction around a primary journal bearing member 124 (see FIGS. 3A and 3B) as indicated by the arrow surrounding the primary cone bearing member 122. In this orientation, the first side surface 146 may face toward the bit body 102 (see FIGS. 1 and 2) and the second side surface 148 may face an underlying earth formation (not shown). The counterclockwise rotation of the primary cone bearing member 122 may draw working fluid into the helically extending channels 142 from the first side surface 146 due to the angled orientation of the channels 142. As additional fluid is drawn into the channels 142 from the first side surface 146, the working fluid may create a pressure directed through the channels 142 to the second side surface 148, as indicated by the arrow extending along one of the channels 142 in FIG. 5I. Such action may cause the cone bearing member 122 to act as a pump in the direction of the natural flow of the working fluid, which may be directed downward from the first side surface 146 to the second side surface 148. Thus, the direction of rotation of the primary cone bearing member 122 and the helical orientation of the channels 142 may contribute to the flow of working fluid through the channels 142.

In other embodiments, primary cone bearing members 122 may include channels 142 in any of the configurations described previously in connection with the primary journal bearing members 124 shown in FIGS. 4I through 4Q. In other words, the channel 142 configurations described in FIGS. 4I through 4Q may be projected from the outer contact surface 134 of the primary journal bearing members 124 onto the inner contact surface 144 of the primary cone bearing members 122. Though the primary cone bearing members 122 may include channels 142 in such configurations, it is not required that those primary cone bearing members 122 be used with primary journal bearing members 124 having a like channel 142 configuration.

When incorporated into the bearing system 128, the primary journal bearing member 124, the primary cone bearing member 122 (see FIGS. 3A and 3B), or both may comprise at least one channel 142. Additionally, any combination of channel 142 configurations may be employed. For example, the primary journal bearing member 124 may comprise a channel 142 formed as a single notch in the outer contact surface 134 of the primary journal bearing member 124, and the primary cone bearing member 122 may comprise a plurality of channels 142 formed in the interior of the primary cone bearing member 122 and extending between openings at opposing side surfaces 146 and 148 of the primary cone bearing member 122 and extending in a direction substantially parallel to the central axis of the primary cone bearing member 122. Any combination of channel 142 configurations may be employed such that at least one primary bearing member 122, 124, or 122 and 124 comprises at least one channel 142. Furthermore, the channels 142 may be configured to minimize stresses within the primary journal bearing member 124 and the primary cone bearing member 122 while maximizing heat removal efficiency.

Pressurized working fluid flowing through the bearing system 128 (see FIGS. 3A and 3B) may form and fill an at least substantially uniform gap between the primary journal bearing member 124 and the primary cone bearing member 122 (see FIGS. 3A and 3B), causing the primary cone bearing member 122 (see FIGS. 3A and 3B) to hover or float around the primary journal bearing member 124. For example, a distance between the primary journal bearing member 124 and the primary cone bearing member 122 may be between about 0.01 mm and about 1.00 mm. More specifically, the distance between the primary journal bearing member 124 and the primary cone bearing member 122 as the primary cone bearing member 122 rotates around the primary journal bearing member 124 may be between about 0.15 mm and 0.25 mm. As the working fluid flows between the opposing side surfaces 130 and 132, the working fluid may remove abrasive particles that may otherwise remain between the primary journal bearing member 124 and the primary cone bearing member 122 (see FIGS. 3A and 3B), which may erode, damage, or even cause failure of the primary journal bearing member 124, the primary cone bearing member 122 (see FIGS. 3A and 3B), or both the primary journal bearing member 124 and the primary cone bearing member 122 (see FIGS. 3A and 3B). Thus, the channels 142 may reduce the wear rate of the primary bearing 121 as compared to primary bearings lacking channels.

Like the primary journal bearing members 124 and the primary cone bearing members 122 described with reference to FIGS. 4A through 5E, secondary journal bearing members 125 and secondary cone bearing members 123 may comprise annular members having outer and inner contact surfaces, respectively, and may be configured to bear radial loads acting on the assembled bearing system 128 (see FIGS. 3A and 3B). The secondary journal bearing member 125, the secondary cone bearing member 123, or both the secondary journal bearing member 125 and the secondary cone bearing member 123 may comprise at least one channel 142 formed therein, such as, for example, any of the channel 142 configurations described in connection with FIGS. 4A through 5E. Thus, the secondary bearings 127 (see FIG. 3A) that are configured to bear radial loads may be configured in a manner similar to the primary bearings 121, which are configured to bear radial loads. Where a bearing system 128 includes at least one primary bearing 121 and at least one secondary bearing 127 configured to bear radial loads, the primary bearings 121 may have the same channel 142 configuration as the secondary bearings 127 in some embodiments. In other embodiments, the primary bearings 121 may have a different channel 142 configuration from the secondary bearings 127.

Figure 6A:
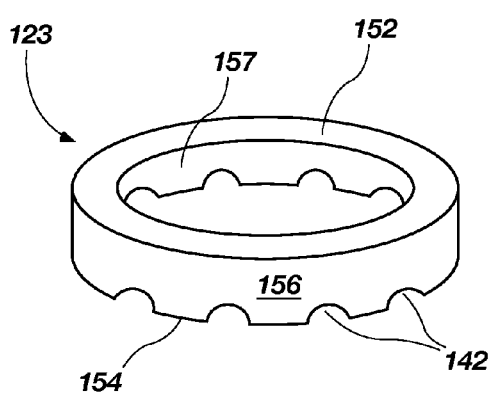
FIGS. 6A through 6H are perspective views of embodiments of thrust bearing members.

Like the primary bearings 121 and the secondary bearings 127 configured to bear radial loads, secondary bearings 127 configured to bear axial loads, sometimes referred to as "thrust bearings," may include at least one channel 142. For example, at least one of a secondary cone bearing member 123 and a secondary journal bearing member 125 may comprise at least one channel 142 formed therein. For example, FIG. 6A depicts a secondary cone bearing member 123 configured for use in a thrust bearing. The secondary cone bearing member 123 may comprise a generally annular member having an annular top surface 152, a generally annular lower contact surface 154 parallel to the annular top surface 152, a side surface 156 transverse to and intersecting with the top surface 152 and the lower contact surface 154 defining an outer diameter of the secondary cone bearing member 123, and an inner surface 157 transverse to and intersecting with the top surface 152 and the lower contact surface 154 defining an inner diameter of the secondary cone bearing member 123, in some embodiments. In other embodiments, the secondary cone bearing member 123 may comprise a generally disc-shaped member having a circular top surface 152 and a generally circular lower contact surface 154 parallel to the top surface 152. Channels 142 may be formed in the lower contact surface 154 of the secondary cone bearing member 123 and have openings in the side surface 156 and inner surface 157 of the secondary cone bearing member 123. Although the channels 142 shown in FIG. 6A comprise four straight, linear channels, the channels 142 may comprise any number of channels 142 extending in any direction and having any cross-sectional shape. For example, the channels 142 may comprise two arcuate channels 142, a plurality of channels 142 extending radially from a central axis of the secondary cone bearing member 123, or a single linear channel 142. The channels 142 enable the working fluid to flow across the lower contact surface 154 of the secondary cone bearing member 123 to provide lubrication at the second interface 129 (see FIGS. 3A and 3B) between the secondary cone bearing member 123 and the secondary journal bearing member 125, to cool the axial bearing 127 and other components in proximity therewith, and to remove abrasive particles that may shorten the useful life of the secondary bearing 127.

Figure 6B:
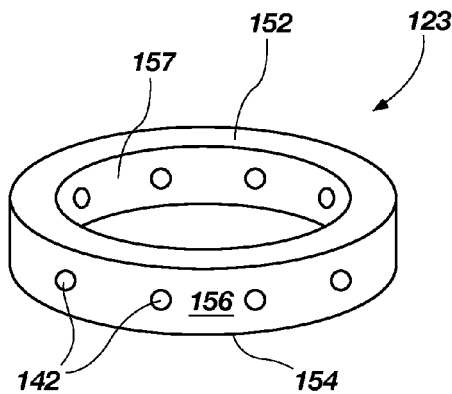

As shown in FIG. 6B, channels 142 may not be formed in the lower contact surface 154 of the secondary cone bearing member 123, but may be formed internally to the secondary cone bearing member 123 and have outlets at the side surface 156 and the inner surface 157 of the secondary cone bearing member 123. The channels 142 enable the working fluid to flow across the secondary cone bearing member 123 and to cool the axial bearing 127 and other components in proximity therewith, but do not generally provide additional lubrication at the second interface 129 between the secondary cone bearing member 123 and the axial journal bearing member 125 or remove abrasive particles from the second interface 129 between the secondary cone bearing member 123 and the secondary journal bearing member 125.

Figure 6C:
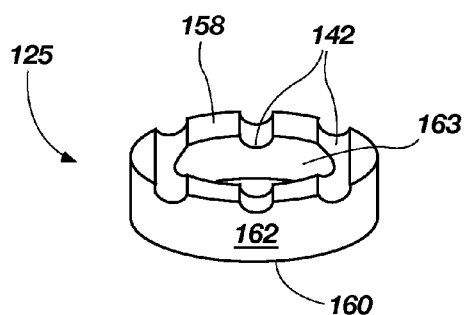
Figure 6D:
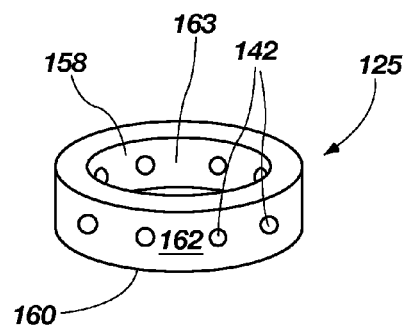

As shown in FIGS. 6C and 6D, a secondary journal bearing member 125 may have a generally annular shape including an upper contact surface 158 having a generally annular shape, a bottom surface 160 parallel to the upper contact surface 158 and having an annular shape, a side surface 162 transverse to and intersecting with the upper contact surface 158 and the bottom surface 160 defining an outer diameter of the secondary journal bearing member 125, and an inner surface 163 transverse to and intersecting with the upper contact surface 158 and the bottom surface 160 defining an inner diameter of the secondary journal bearing member 125, in some embodiments. In other embodiments, the secondary cone bearing member 123 (see FIGS. 6A and 6B) may comprise a generally disc-shaped member having a generally circular upper contact surface 158 and a circular bottom surface 160 parallel to the upper contact surface 158. Channels 142 are formed in the upper contact surface 158 of the secondary cone bearing member 123 and have openings in the side surface 156 and the inner surface 163 of the secondary cone bearing member 123. The channels 142 enable the working fluid to flow across the upper contact surface 158 of the secondary journal bearing member 125 to provide lubrication at the second interface 129 (see FIGS. 3A and 3B) between the secondary cone bearing member 123 and the secondary journal bearing member 125, to cool the secondary bearing 127 and other components in proximity therewith, and to remove abrasive particles that may shorten the useful life of the secondary bearing 127. The channels 142 may comprise any number of channels 142 extending in any direction and having any cross-sectional shape. As shown in FIG. 6D, the channels 142 may also be formed internally within the secondary journal bearing member 125 and have outlets at the side surface 162 and the inner surface 163 thereof.

Figure 6E:
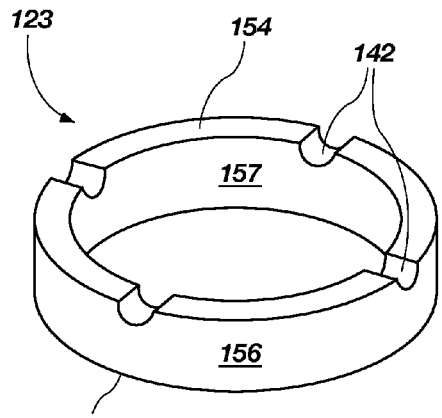

Referring to FIG. 6E, another embodiment of a secondary cone bearing member 123 configured to bear axial loads is shown. The secondary cone bearing member 123 may include a plurality of channels 142 extending radially outwardly like spokes in the lower contact surface 154 of the secondary cone bearing member 123. For example, the secondary cone bearing member 123 may include four channels 142 spaced circumferentially evenly (i.e., 90°) from one another and extending radially between the inner surface 157 and the side surface 156 of the secondary cone bearing member 123.

Figure 6F:
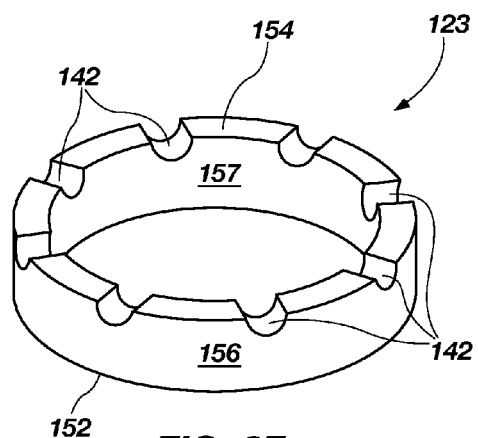

Referring to FIG. 6F, another embodiment of a secondary cone bearing member 123 configured to bear axial loads is shown. The secondary cone bearing member 123 may include a plurality of channels 142 extending radially outwardly like spokes in the lower contact surface 154 of the secondary cone bearing member 123. For example, the secondary cone bearing member 123 may include eight channels 142 spaced circumferentially evenly (i.e., 45°) from one another and extending radially between the inner surface 157 and the side surface 156 of the secondary cone bearing member 123.

Figure 6G:
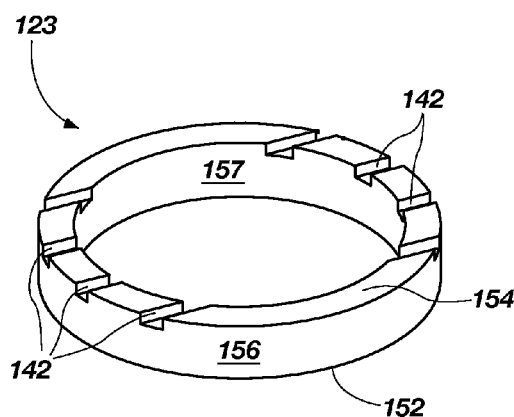

Referring to FIG. 6G, another embodiment of a secondary cone bearing member 123 configured to bear axial loads is shown. The secondary cone bearing member 123 may comprise a plurality of linear channels 124 extending from one side of the side surface 156 to an opposing side of the side surface 156 and intersecting with the inner surface 157 in between the opposing sides of the side surface 156. Rather than the semicircular cross-sectional shape of the channels 142 shown in other embodiments (see, e.g., FIGS. 6E and 6F), the channels 142 may have a rectangular cross-sectional shape.

Figure 6H:
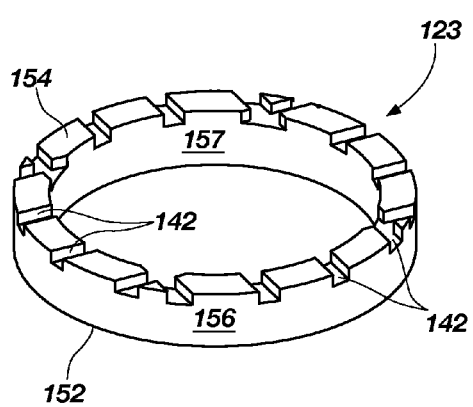

Referring to FIG. 6H, another embodiment of a secondary cone bearing member 123 configured to bear axial loads is shown. The secondary cone bearing member 123 may include sets of channels 142 extending radially outwardly like spokes in the lower contact surface 154 of the secondary cone bearing member 123. For example, the secondary cone bearing member 123 may include four sets of four channels 142 extending between the inner surface 157 and the side surface 156 of the secondary cone bearing member 123 across the upper contact surface 154. At least one of the channels 142 from one of the sets of four channels 142 may intersect with at least another channel 142 from another set of four channels 142, which may increase fluid flow and particle removal due to the increased number of channels 142 and due to the larger spaces created by intersecting channels 142.

In other embodiments, secondary journal bearing members 125 may include channels 142 in any of the configurations described previously in connection with the secondary cone bearing members 123 shown in FIGS. 6E through 6H. In other words, the channel 142 configurations described in FIGS. 6E through 6H may be projected from the lower contact surface 154 of the secondary cone bearing members 123 onto the upper contact surface 158 of the secondary journal bearing members 125. Though the secondary journal bearing members 125 may include channels 142 in such configurations, it is not required that those secondary journal bearing members 125 be used with secondary cone bearing members 123 having a like channel 142 configuration.

Figure 7A:
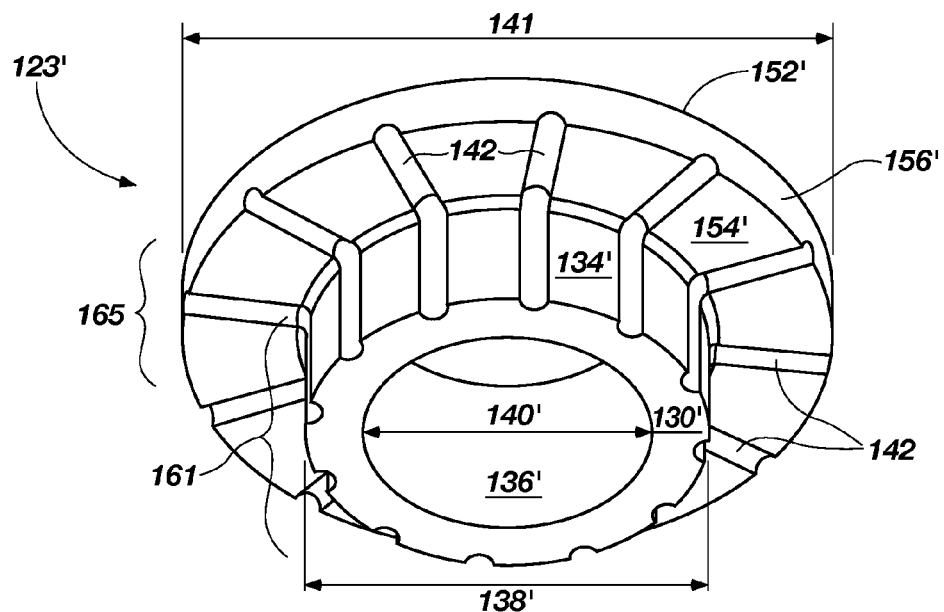
FIGS. 7A and 7B are perspective views of embodiments of a hybrid thrust and radial bearing members.

Referring to FIG. 7A, a secondary journal bearing member 123' that may be used in a secondary bearing 127' (see FIG. 3B) is shown. Such a secondary journal bearing member 123' may be employed in a secondary bearing 127' configured to bear both axial and radial loads. The secondary journal bearing member 123' may generally be configured as a combination of the secondary journal bearing members 123 generally configured like the primary journal bearing members 124 shown in FIGS. 4A through 4H and the secondary journal bearing members 123 shown in FIGS. 6A and 6B. Thus, the secondary journal bearing member 123' may comprise a generally cylindrical portion 161 having a side surface 130' defining an at least substantially annular cross-section, an outer contact surface 134' defining an intermediate outer diameter 138' of the secondary journal bearing member 123', an inner surface 136' defining an inner diameter 140' of the secondary journal bearing member 123'. The secondary journal bearing member 123' may further comprise a generally annular portion 165 connected to the generally cylindrical portion 161 and extending radially outward at a top of the cylindrical portion 161. The generally annular portion 165 may have an annular top surface 152', a generally annular lower contact surface 154' parallel to the annular top surface 152', a side surface 156' transverse to and intersecting with the top surface 152' and the lower contact surface 154' defining an outer diameter 141, greater than the intermediate outer diameter 138', of the secondary journal bearing member 123', the inner surface 136' being transverse to and intersecting with the top surface 152', in some embodiments. Thus, the lower contact surface 154' may intersect the outer contact surface 134' and the lower and outer contact surfaces 154' and 134' may form a substantially continuous surface configured to abut a secondary cone bearing member 125' at the second interface 129 (see FIG. 3B). A chamfer or a smooth curve may provide a transition between the lower contact surface 154' and the outer contract surface 134'.

At least one channel 142 may be formed in the secondary journal bearing member 123'. For example, a plurality of channels 142 may form linear grooves extending axially in the outer contact surface 134' in the generally cylindrical portion 161 and extending radially outward in the lower contact surface 154' in the generally annular portion 165. Thus, the channels 142 may form a continuous flow path between the side surfaces 130' and 156' of the secondary journal bearing member 123', as shown in FIG. 7A. Further, when it is said that the lower contact surface 154' and the outer contact surface 134' may form a substantially continuous surface, it is meant that the otherwise continuous surface may be interrupted by the channels 142 extending into the lower and outer contact surfaces 154' and 134'. In other embodiments, the channels 142 may be formed within the body of the secondary journal bearing member 123' and have openings at the side surfaces 130' and 156' of the secondary journal bearing member 123', may comprise nonlinear grooves, may comprise any number of grooves, may have any cross-sectional shape, may be of any depth, and may otherwise include channel 142 configurations discussed previously in connection with FIGS. 4A through 6D.

Figure 7B:
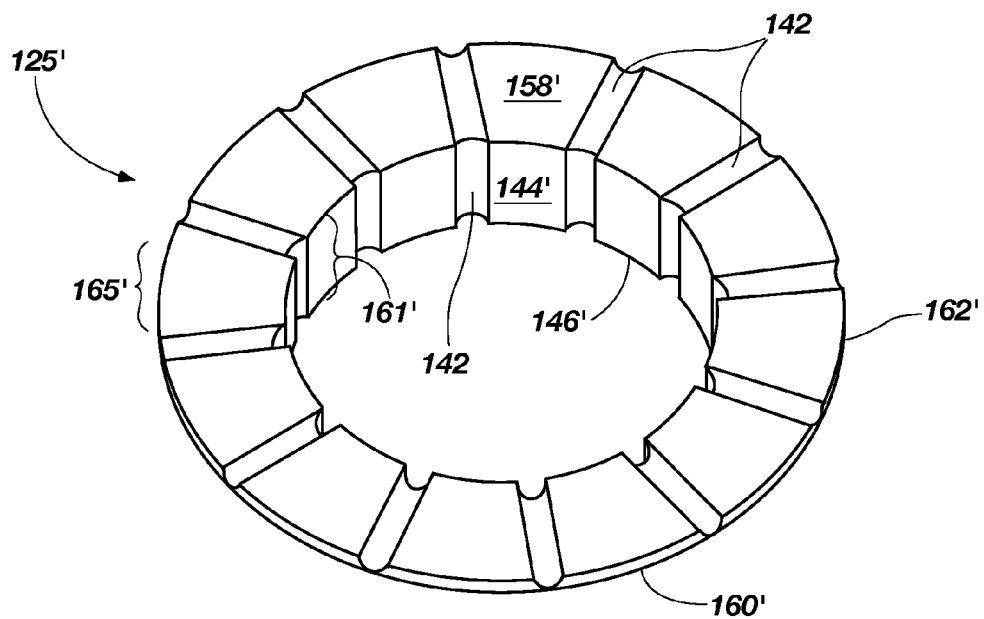

Referring to FIG. 7B, a secondary cone bearing member 125' that may be used in a secondary bearing 127' (see FIG. 3B) is shown. Such a secondary cone bearing member 125' may be employed in a secondary bearing 127' configured to bear both axial and radial loads. The secondary cone bearing member 125' may generally be configured as a combination of the secondary cone bearing members 125 generally configured like the primary cone bearing members shown in FIGS. 5A through 5F and the secondary cone bearing members 125 shown in FIGS. 6C and 6D. Thus, the secondary cone bearing member 125' may comprise a generally cylindrical portion 161' having a side surface 146' defining an at least substantially annular cross-section and an inner contact surface 144' defining an inner diameter of the secondary cone bearing member 125'. The secondary cone bearing member 125' may further comprise a generally annular portion 165' connected to the generally cylindrical portion 161' and extending radially outward at a top of the cylindrical portion 161'. The generally annular portion 165' may have a generally annular upper contact surface 158', an annular bottom surface 160' parallel to the upper contact surface 158', a side surface 162' transverse to and intersecting with the upper contact surface 158' and defining an outer diameter, greater than the intermediate outer diameter, of the secondary cone bearing member 125', the inner contact surface 144' being transverse to and intersecting with the upper contact surface 158', in some embodiments. Thus, the upper contact surface 158' may intersect the inner contact surface 144' and the upper and inner contact surfaces 158' and 144' may form a substantially continuous surface configured to abut a secondary journal bearing member 123' at the second interface 129 (see FIG. 3B). A chamfer or a smooth curve may provide a transition between the upper contact surface 158' and the inner contract surface 144'.

At least one channel 142 may be formed in the secondary cone bearing member 125'. For example, a plurality of channels 142 may form linear grooves extending axially in the inner contact surface 144' in the generally cylindrical portion 161' and extending radially outward in the upper contact surface 158' in the generally annular portion 165'. Thus, the channels 142 may form a continuous flow path between the side surfaces 162' and 146' of the secondary journal bearing member 123', as shown in FIG. 7A. Further, when it is said that the upper contact surface 158' and the inner contact surface 144' may form a substantially continuous surface, it is meant that the otherwise continuous surface may be interrupted by the channels 142 extending into the lower and outer contact surfaces 158' and 144'. In other embodiments, the channels 142 may be formed within the body of the secondary journal bearing member 123' and have openings at the side surfaces 156' of the secondary journal bearing member 123', may comprise nonlinear grooves, may comprise any number of grooves, may have any cross-sectional shape, may be of any depth, and may otherwise include channel 142 configurations discussed previously in connection with FIGS. 4A through 6D.

The primary bearings 121 and the secondary bearings 127 may comprise any suitable material. For example, the journal and cone bearing members 122 through 125 may comprise ceramic materials, such as carbides, nitrides, oxides, and borides, metal materials, such as cobalt, aluminum, copper, magnesium, titanium, iron, steel, and nickel and alloys thereof, superhard materials, such as synthetic diamond grit, natural diamond grit, diamond film, or cubic boron nitride, or any combination of the foregoing materials. As a specific, non-limiting example, the primary bearings 121 and the secondary bearings 127 may comprise a ceramic-metallic composite material (i.e., a cermet) comprising a plurality of tungsten carbide particles in a metal matrix.

Figure 8:
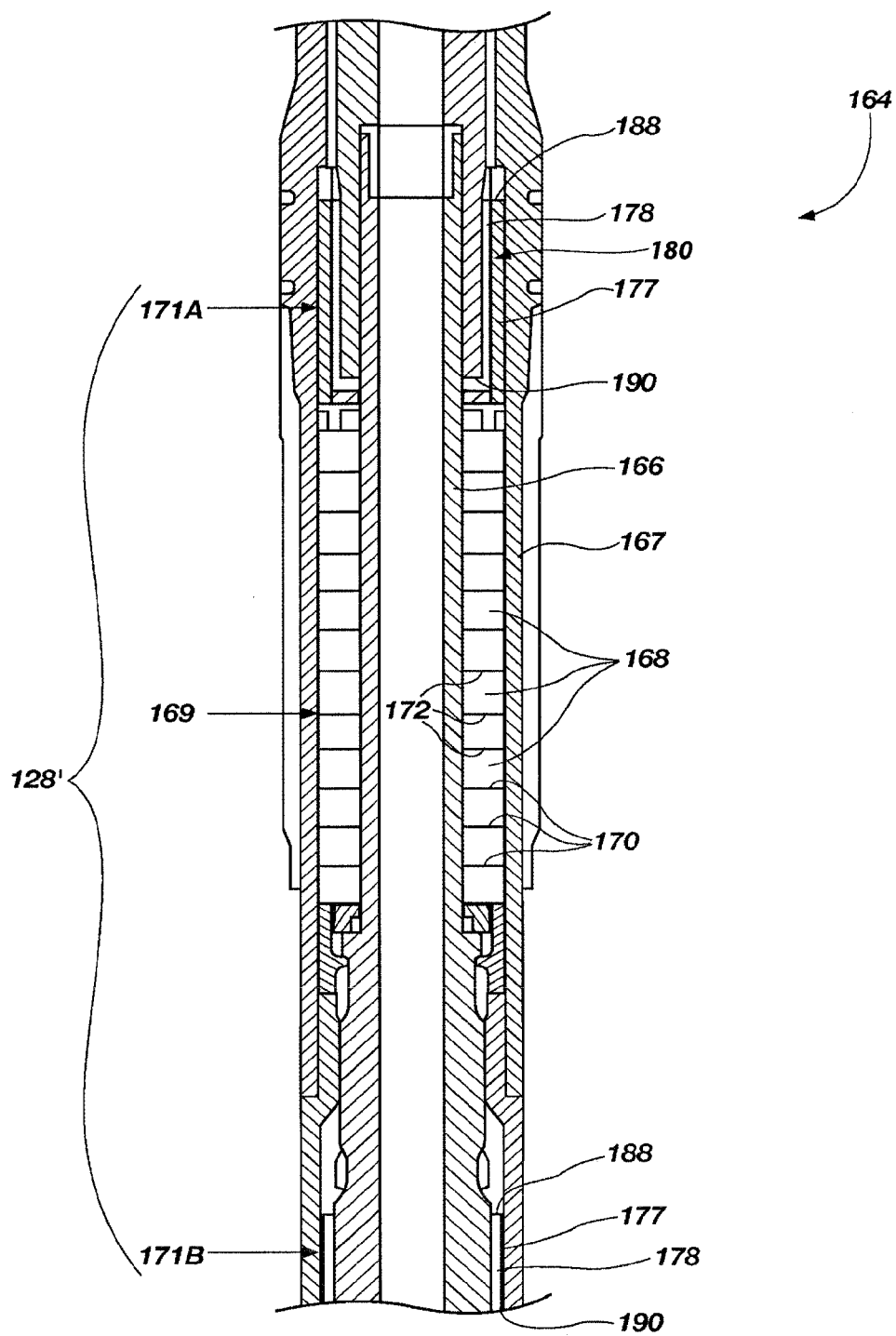
FIG. 8 is a cross-sectional view of another embodiment of a bearing system employed in a downhole motor.

Although the foregoing bearing members 123 through 125 were described as being employed in an earth-boring rotary drill bit, persons of ordinary skill in the art will understand that bearings in accordance with embodiments of the invention may be employed in other downhole tools. For example, a bearing system 128' in accordance with an embodiment of the present invention may be employed in a downhole motor 164, as shown in FIG. 8. The downhole motor 164 may comprise, for example, a Moineau-type "mud" motor or a turbine motor. Components above and below the actual bearing system 128' are not illustrated. The downhole motor 164 includes a central tubular downhole motor driveshaft 166 located rotatably within a tubular bearing housing 167, with the downhole motor bearing system 128' located and providing for relative rotation between the driveshaft 166 and the housing 167. Those skilled in the art will recognize that the driveshaft 166 is rotated by the action of the downhole motor 164 and supplies rotary drive to an earth-boring tool, such as the earth-boring drill bits 100 and 100' illustrated in FIGS. 1 and 2. The housing 167 remains rotationally stationary during motor operation.

The bearing system 128' includes at least one axial bearing 169. The axial bearings 169 may comprise a plurality of axially stacked annular members 168 having abutting upper and lower contact surfaces 170 and 172, respectively. For example, the axial bearings 169 may comprise opposing PCD bearings, such as, for example, those disclosed in U.S. Pat. No. 4,764,036, issued Aug. 16, 1988, to McPherson, the disclosure of which is incorporated herein in its entirety by this reference. Channels 142 may be formed in the upper and lower contact surfaces 170 and 172 in a manner similar to the bearing members 123 and 125 described previously in connection with FIGS. 6A through 6H.

The bearing system 128' also includes at least one radial bearing 171. In the embodiment shown in FIG. 8, the bearing system 128' includes two radial bearings 171, an upper radial bearing 171A and a lower radial bearing 171B. Each radial bearing 171 includes an inner bearing member 178 that is in sliding contact, at a bearing interface 180, with an outer bearing member 177. The inner bearing member 178 is concentrically nested within the outer bearing member 177. In other words, a radially outer surface of the inner bearing member 178 is in sliding contact with a radially inner surface of the outer bearing member 177.

Like the primary journal and cone bearing members 122 and 124 described previously in connection with FIGS. 4A through 5F, the inner and outer radial bearing members 178 and 177 may include channels 142 formed in the inner and outer radial bearing members 178 and 177 to provide a fluid pathway between axially opposing ends 188 and 190 of the radial bearing member 178 or to provide a local reservoir of working fluid at an interface between the inner and outer bearing members 178 and 177. Like the channels 142 described previously in connection with FIGS. 4A through 5F, the channels may facilitate working fluid flow across each radial bearing 171, which may enable increased cooling of each radial bearing 171 and the components in proximity therewith, may provide additional lubrication to the interface between the inner and outer radial bearing members 178 and 177, and may remove abrasive particles that may otherwise shorten the useful life of the radial bearing 127.

Figures 9A, 9B:
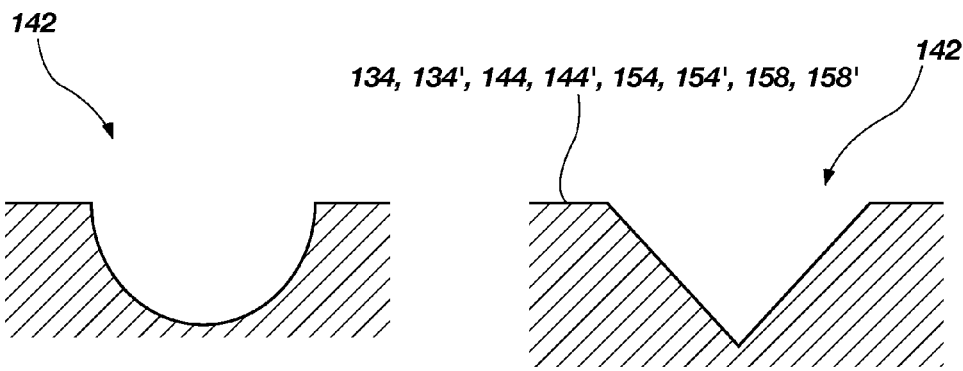
FIGS. 9A through 9D are cross-sectional and plan views of channels that may be formed in bearing members.
Figures 9C, 9D:
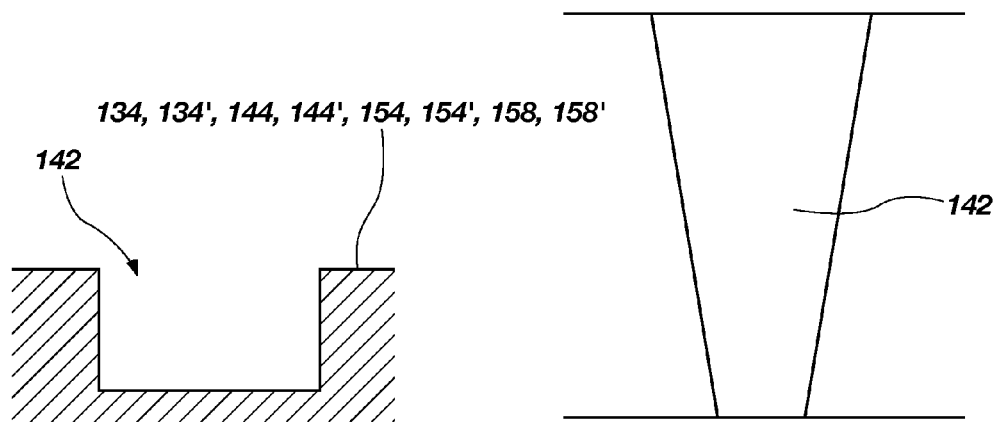

Referring to FIG. 9A, a cross-sectional view of a channel 142 is shown. The channel 142 may have a semicircular cross-sectional shape. In other embodiments, the channel 142 may have a curved shape that defines more than half a circle, less than half a circle, a partial oval, a partial ellipse, or another curved shape. Referring to FIG. 9B, a cross-sectional view of another embodiment of a channel 142 is shown. The channel may have a "V" shaped cross-sectional shape. For example, the channel 142 may comprise a groove defined by two planes oriented at about 90° to one another and at about 225° from the contact surface 134, 134', 144, 144', 154, 154', 158, or 158' in which it is formed. Referring to FIG. 9C, a cross-sectional view of another embodiment of a channel 142 is shown. The channel 142 may have a rectangular cross-sectional shape. In some embodiments, corners of rectangular channels 142 may be chamfered or rounded to provide a transition between surfaces of the channels 142 and between the channels 142 and the contact surfaces 134, 134', 144, 144', 154, 154', 158, or 158' in which they are formed. A width w of any of the foregoing channel configurations at a widest portion of the channels 142 may be between about 0.5 mm and about 6.0 mm. More specifically, the width w of the channels 142 may be between about 2.0 mm and about 5.0 mm. Likewise, a depth d of any of the foregoing channel configurations may be between about 0.5 mm and about 4 mm. More specifically, the depth d of the channels 142 may be between about 1.0 mm and about 3.0 mm. Referring to FIG. 9D, a plan view of a channel 142 is shown. The channel 142 may have a non-uniform cross-sectional shape, cross-sectional area, or both a non-uniform shape and area. For example, the channel 142 may exhibit a taper between opening ends of the channel 142. In such embodiments, the non-uniform cross-section of the channel 142, and resulting change in cross-sectional area, may create a pressure gradient across the channel 142, which may cause working fluid to be pumped in a desired direction, increasing fluid flow and particle removal. Any of the foregoing channel 142 configurations may be used in combination with any of the bearing systems 128 and 128' and their corresponding components described previously.

In practice, working fluid, such as, for example, drilling mud, may be pumped to a bearing system 128 or 128' and may flow within channels 142 formed in one or all of the bearings 121, 127, 127', 169, and 171. As the working fluid flows through the bearing system 128 or 128', and specifically within the channels 142, heat may be transferred from the relatively hotter bearings 121, 127, 127', 169, and 171 to the relatively colder working fluid. By flowing the heated working fluid away from the bearing system 128 or 128', and therefore away from one or all of the bearings 121, 127, 127', 169, and 171, the bearing system 128 or 128' may be cooled.

In any of the foregoing embodiments, the contact surfaces 134, 134', 144, 144' 154, 154', 158, and 158' may comprise a superhard material, such as, for example, a polycrystalline diamond material, a diamond film or a cubic boron nitride material. Such superhard material may be secured to a substrate of a cermet material, such as, for example, cemented tungsten carbide.

While the present disclosure has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

What is claimed is:

1. A downhole tool, comprising:
    a body;
    a first bearing member fixed to the body, the first bearing member comprising an outer contact surface defining an outer diameter;
    a second bearing member rotatable about the first bearing member, the second bearing member comprising an inner contact surface defining an inner diameter, the inner diameter of the second bearing member being larger than the outer diameter of the first bearing member and the inner contact surface of the second bearing member being in sliding contact with the outer contact surface of the first bearing member at an interface;
    wherein the first bearing member comprises a channel formed in the outer contact surface of the first bearing member, the channel comprising a notch defining a flat surface interrupting an otherwise circular cross-sectional shape of the outer contact surface;
    a third bearing member fixed to the body, the third bearing member comprising a lower contact surface; and
    a fourth bearing member rotatable with respect to the third bearing member, the fourth bearing member comprising an upper contact surface, wherein the third bearing member abuts against the fourth bearing member at in interface between the lower contact surface and the upper contact surface, the third and fourth bearing members being configured to rotate slidably relative to one another,
    wherein at least one of the third and fourth bearing members comprises at least one channel extending, and configured to provide a fluid pathway across, at least one of the third and fourth bearing members.

2. The downhole tool of claim 1, wherein the body comprises a bearing pin of a roller cone earth-boring drill bit and wherein the second bearing member is fixed to a roller cone.

3. The downhole tool of claim 1, wherein each of the first bearing member and the second bearing member comprises a ceramic-metallic composite material.

4. The downhole tool of claim 1, further comprising at least another channel formed in the inner contact surface of the second bearing member.

5. The downhole tool of claim 4, wherein the first bearing member and the second bearing member are of generally cylindrical configuration, each having a central axis transverse to respective opposing side surfaces, and the at least another channel comprises at least one at least substantially linear, axially oriented groove extending into the inner contact surface of the second bearing member.

6. The downhole tool of claim 4, wherein the at least another channel comprises a groove defining a closed flow path extending around the inner contact surface of the second bearing member.

7. The downhole tool of claim 4, wherein the at least another channel comprises at least one at least substantially helical groove in the inner contact surface of the second bearing member.

8. The downhole tool of claim 7, wherein the at least one at least substantially helical groove comprises a first plurality of channels extending helically in a first direction and a second plurality of channels extending helically in a second, transverse direction to define a cross-hatch pattern.

9. The downhole tool of claim 4, wherein the at least another channel is positioned in an interior wall of the second bearing member and opens at opposing side surfaces thereof.

10. The downhole tool of claim 1, wherein the at least one channel of the at least one of the third and fourth bearing members comprises a plurality of channels.

11. The downhole tool of claim 1, wherein the at least one channel extends through an interior of the at least one of the third and fourth bearing members and has openings at a side surface thereof.

12. The downhole tool of claim 1, wherein the at least one channel of the least one of the third and fourth bearing members is formed in one of the lower contact surface of the third bearing member and the upper contact surface of the fourth bearing member and has openings in a side surface and an inner surface of one of the third bearing member and the fourth bearing member.

13. A method of making a downhole tool, comprising:
    forming a channel in a first bearing member comprising an outer contact surface defining an outer diameter, the channel comprising a notch defining a flat surface interrupting an otherwise circular cross-sectional shape of the outer contact surface;
    fixing the first bearing member to a body of the downhole tool;
    positioning the first bearing member at least partially within a second bearing member comprising an inner contact surface defining an inner diameter, the inner diameter of the second bearing member being larger than the outer diameter of the first bearing member and the inner contact surface of the second bearing member being in sliding contact with the outer contact surface of the first bearing member at an interface;
    fixing a third bearing member to the body, the third bearing member comprising a lower contact surface;
    positioning a fourth bearing member in sliding, rotational contact with the third bearing member, the fourth bearing member comprising an upper contact surface, wherein the third bearing member abuts against the fourth bearing member at an interface between the lower contact surface and the upper contact surface; and forming at least one channel extending, and configured to provide a fluid pathway, across at least one of the third and fourth bearing members.

14. The method of claim 13, wherein fixing the first bearing member to the body comprises fixing the first bearing member to a bearing pin of a roller cone earth-boring drill bit and further comprising fixing the second bearing member to a roller cone.

15. The method of claim 13, further comprising forming each of the first bearing member and the second bearing member to comprise a ceramic-metallic composite material.

16. The method of claim 13, further comprising forming at least another channel in the inner contact surface of the second bearing member.

17. The method of claim 16, wherein the first bearing member and the second bearing member are of generally cylindrical configuration, each having a central axis transverse to respective opposing side surfaces, and wherein forming the at least another channel in the inner contact surface of the second bearing member comprises forming at least one at least substantially linear, axially oriented groove extending into the inner contact surface of the second bearing member.

18. The method of claim 16, wherein forming the at least another channel in the inner contact surface of the second bearing member comprises fainting at least one at least substantially helical groove in the inner contact surface of the second bearing member.

\* \* \* \* \*

UNITED STATES PATENT AND TRADEMARK OFFICE
CERTIFICATE OF CORRECTION

PATENT NO. : 9,290,997 B2  
APPLICATION NO. : 14/312080  
DATED : March 22, 2016  
INVENTOR(S) : Alejandro Flores et al.

Page 1 of 1

It is certified that error appears in the above-identified patent and that said Letters Patent is hereby corrected as shown below:

On the title page:
In ITEM (75) Inventors: Lines 5, 6, 9 and 10   change "Louise F. van Staden, Gauteng (ZA);" to --Louise F. van Staden, Ebotse (ZA);--; "Gregory B. Swanepoel, Gauteng (ZA);" to --Gregory B. Swanepoel, Boksburg (ZA);--; "Dragan Vukovic, Johannesburg (ZA);" to --Dragan Vukovic, Northcliff (ZA);--; and "Klaus Tank, Johannesburg (ZA);" to --Klaus Tank, Essexwold (ZA);--

In the specification:
COLUMN 6,   LINE 1,   change "be fixated in" to --be formed in--  
COLUMN 8,   LINE 35,   change "channels 142 fanned in" to --channels 142 formed in--  
COLUMN 11,   LINE 6,   change "may be aimed in" to --may be formed in--

In the claims:
CLAIM 1,   COLUMN 21,   LINES 56-57,   change "member at in interface" to --member at an interface--  
CLAIM 8,   COLUMN 22,   LINE 24,   change "channels extending" to --grooves extending--  
CLAIM 8,   COLUMN 22,   LINE 25,   change "channels extending" to --grooves extending--  
CLAIM 12,   COLUMN 22,   LINE 38,   change "of the least" to --of the at least--  
CLAIM 18,   COLUMN 23,   LINE 25,   change "comprises fainting at least" to --comprises forming at least--

Signed and Sealed this  
Twenty-eighth Day of June, 2016

Michelle K. Lee  
*Director of the United States Patent and Trademark Office*